United States Patent [19]
Ozaki et al.

[11] Patent Number: 5,696,757
[45] Date of Patent: Dec. 9, 1997

[54] OPTICAL DISC, DEVICE FOR CHECKING OPTICAL DISC AND DEVICE FOR RECORDING INFORMATION ON OPTICAL DISC

[75] Inventors: Kazuhisa Ozaki, Yokosuka; Kanji Kayanuma, Hadano; Hirofumi Nagano, Yokohama, all of Japan

[73] Assignee: Victor Company of Japan, Ltd., Yokohama, Japan

[21] Appl. No.: 717,663

[22] Filed: Sep. 23, 1996

Related U.S. Application Data

[63] Continuation of Ser. No. 222,268, Apr. 4, 1994, abandoned.

[30] Foreign Application Priority Data

Jul. 29, 1993 [JP] Japan ................. 5-207136
Feb. 10, 1994 [JP] Japan ................. 6-037748

[51] Int. Cl.⁶ .................... G11B 7/24; G11B 3/90
[52] U.S. Cl. .................... 369/275.4; 369/58
[58] Field of Search .................... 369/58, 275.4, 369/275.3, 54, 84, 83, 44.26; 360/15, 13, 60; 386/94; 380/3, 5

[56] References Cited

U.S. PATENT DOCUMENTS

| | | | |
|---|---|---|---|
| 4,849,836 | 7/1989 | Kaghikian | 360/60 |
| 4,879,704 | 11/1989 | Takagi et al. | 369/14 |
| 5,428,598 | 6/1995 | Veldhuis et al. | 369/275.3 |
| 5,432,647 | 7/1995 | Tateishi | 360/60 |
| 5,453,968 | 9/1995 | Veldhuis et al. | 369/84 |
| 5,461,220 | 10/1995 | Ogino | 369/59 |
| 5,572,507 | 11/1996 | Ozaki et al. | 369/275.4 |

FOREIGN PATENT DOCUMENTS

| | | |
|---|---|---|
| 0545472 | 6/1993 | European Pat. Off. |
| 62-078727 | 4/1987 | Japan. |
| 2-87344 | 3/1990 | Japan. |
| 3181023 | 8/1991 | Japan. |

*Primary Examiner*—Tan Dinh
*Attorney, Agent, or Firm*—Lowe, Price, LeBlanc & Becker

[57] ABSTRACT

An optical disc on which a number of spiral trains of regular pits and at least one train of irregular pits are formed. The regular pits of each of the trains is arranged symmetrically with respect to the center of a track. Each of the irregular pits has a predetermined shape different from a shape of each of the regular pits. An arrangement of the train of the irregular pits being differs from an arrangement of each of the trains of the regular pits. A tracking error signal being obtained from the train of the irregular pits. An irregular pit can not be copied even when a normal optical disc containing such an irregular pit is copied by performing a conventional copying method. Thus, an illegal copy disc can be discriminated from a normal optical disc by checking whether or not an irregular pit is included in an optical disc to provide good copy protection by easily detecting an illegal copy disc.

38 Claims, 20 Drawing Sheets

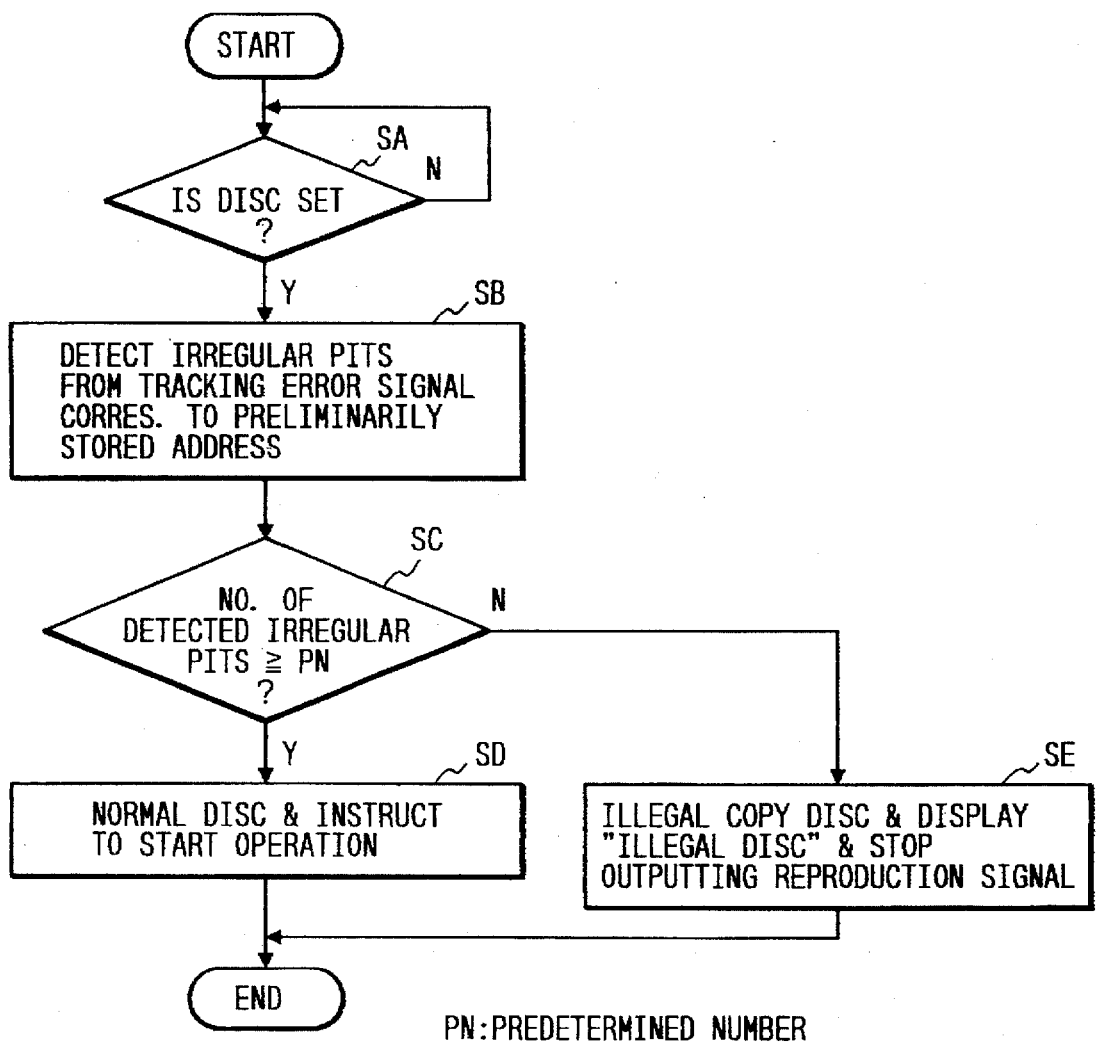

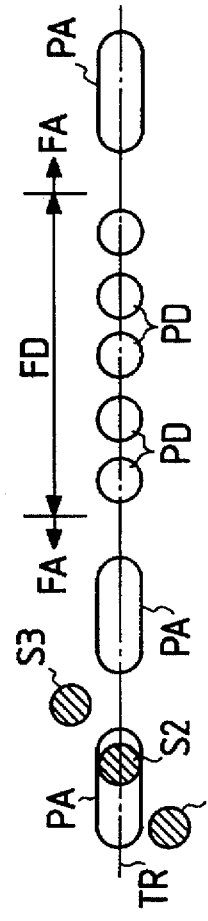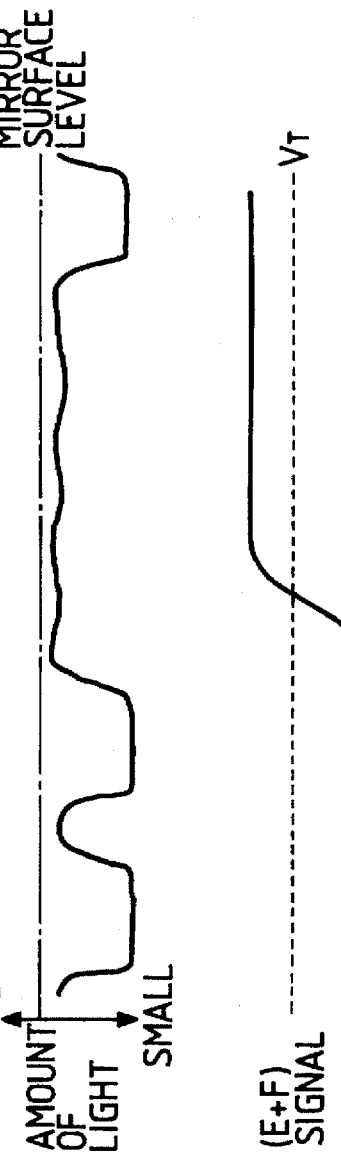

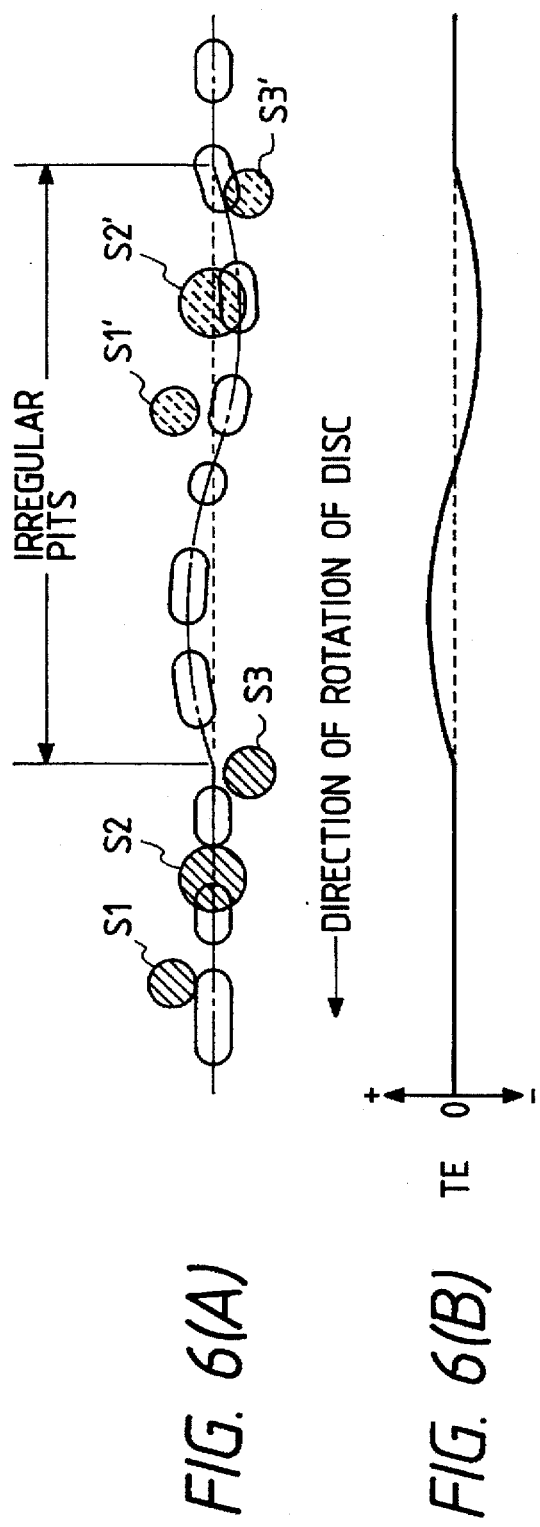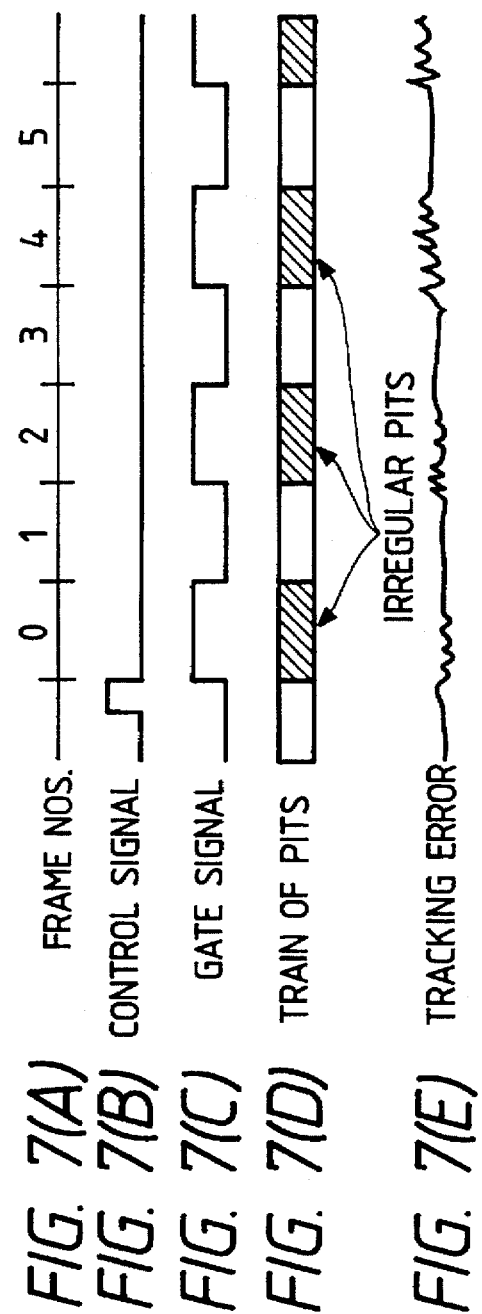

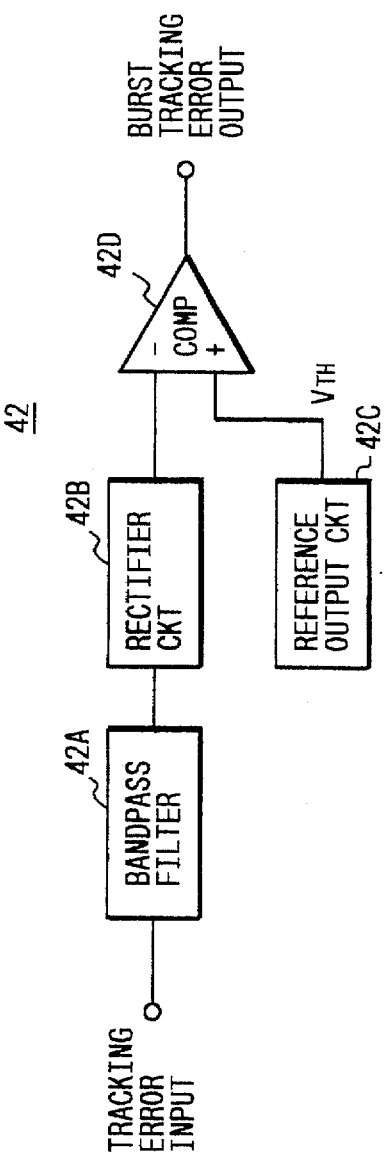
FIG. 10
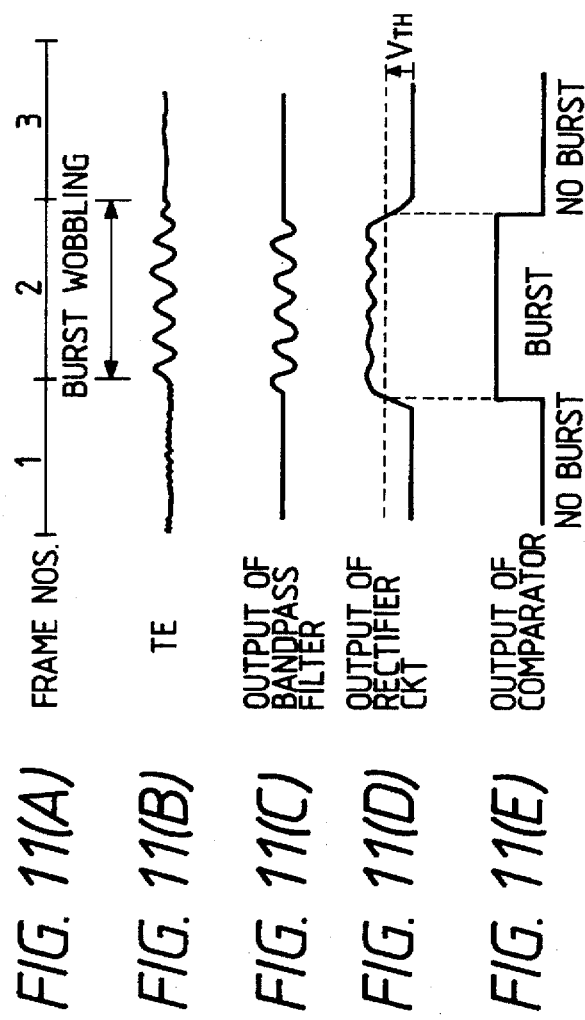
FIG. 11(A)
FIG. 11(B)
FIG. 11(C)
FIG. 11(D)
FIG. 11(E)

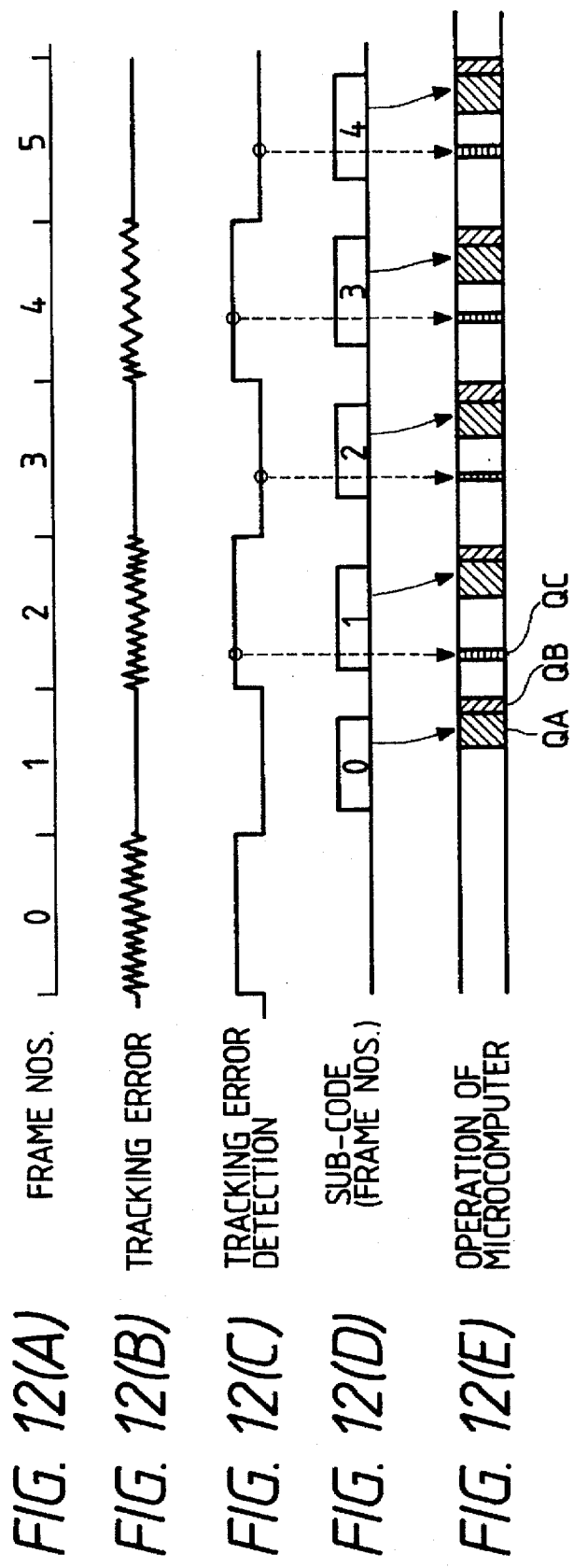

FIG. 15(A)
FIG. 15(B)
FIG. 15(C)
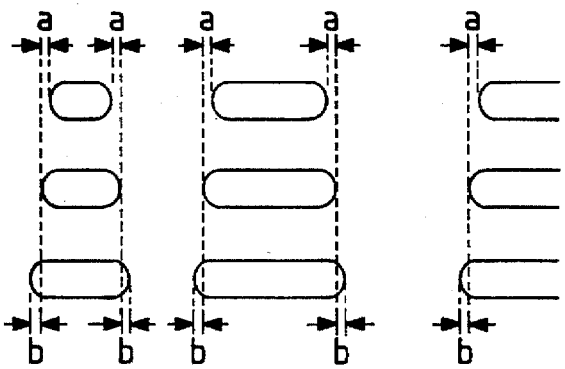
FIG. 16
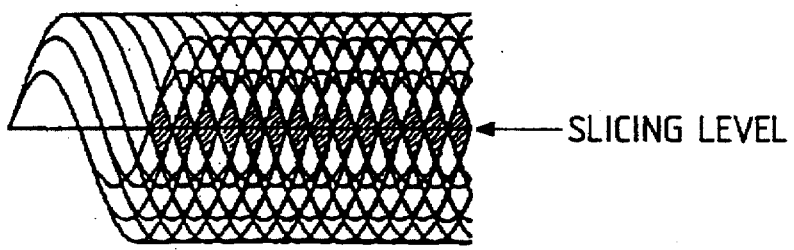
← SLICING LEVEL

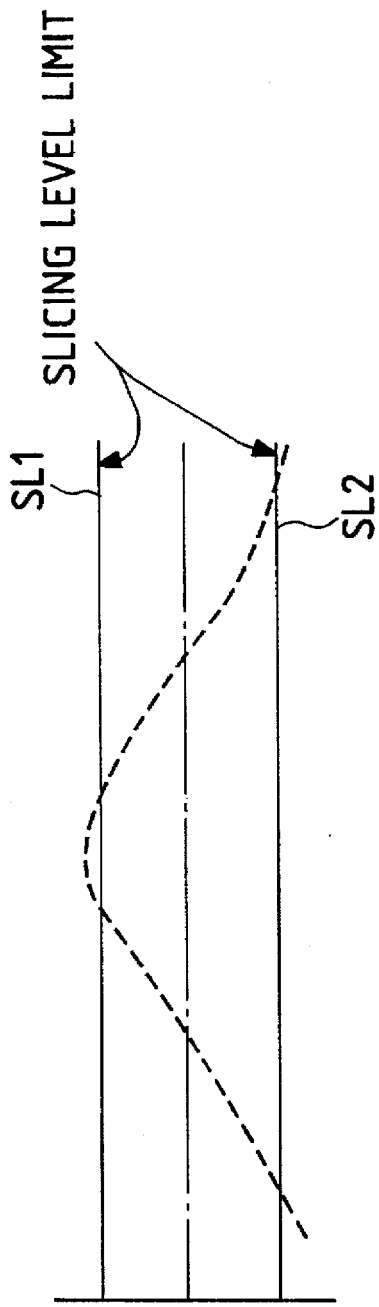
FIG. 20(A)
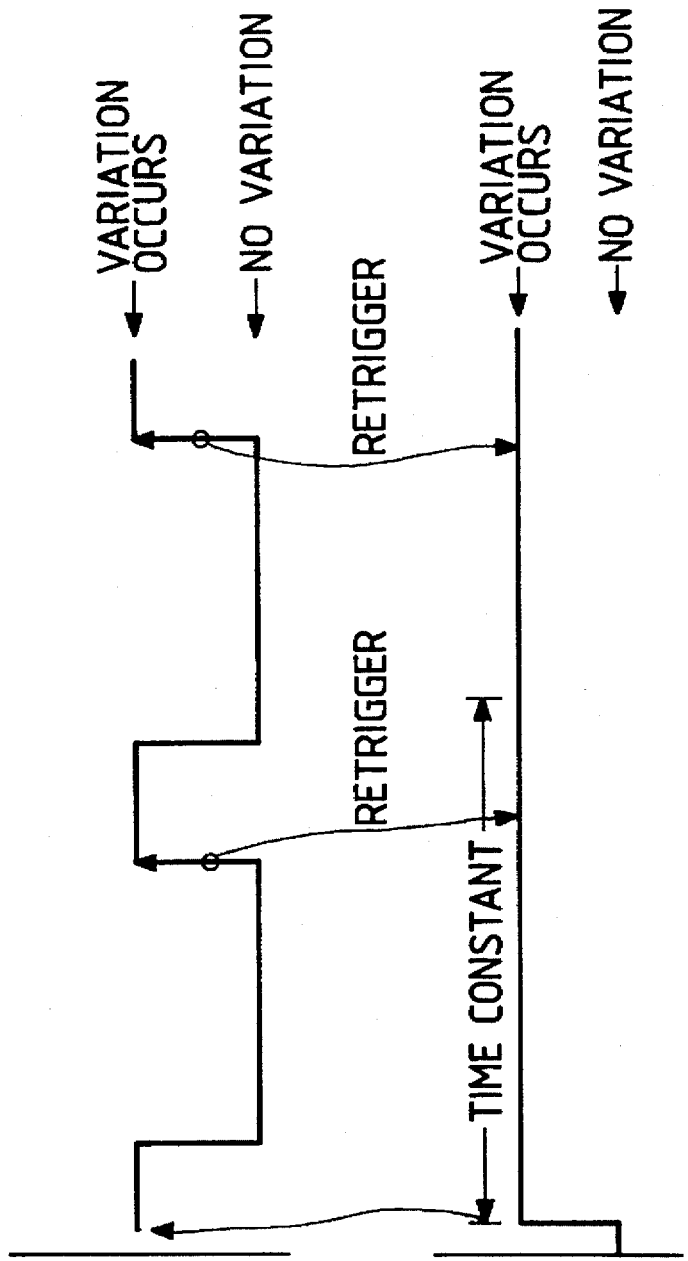
FIG. 20(B)
FIG. 20(C)

FIG. 22(A) FRAME NOS.
FIG. 22(B) CONTROL SIGNAL
FIG. 22(C) GATE SIGNAL
FIG. 22(D) PITS
FIG. 22(E) RF SIGNAL
FIG. 22(F) DETECTED SIGNAL

VAL: VARIATION-IN-AMOUNT-OF-LIGHT

RO: REFERENCE OUTPUT

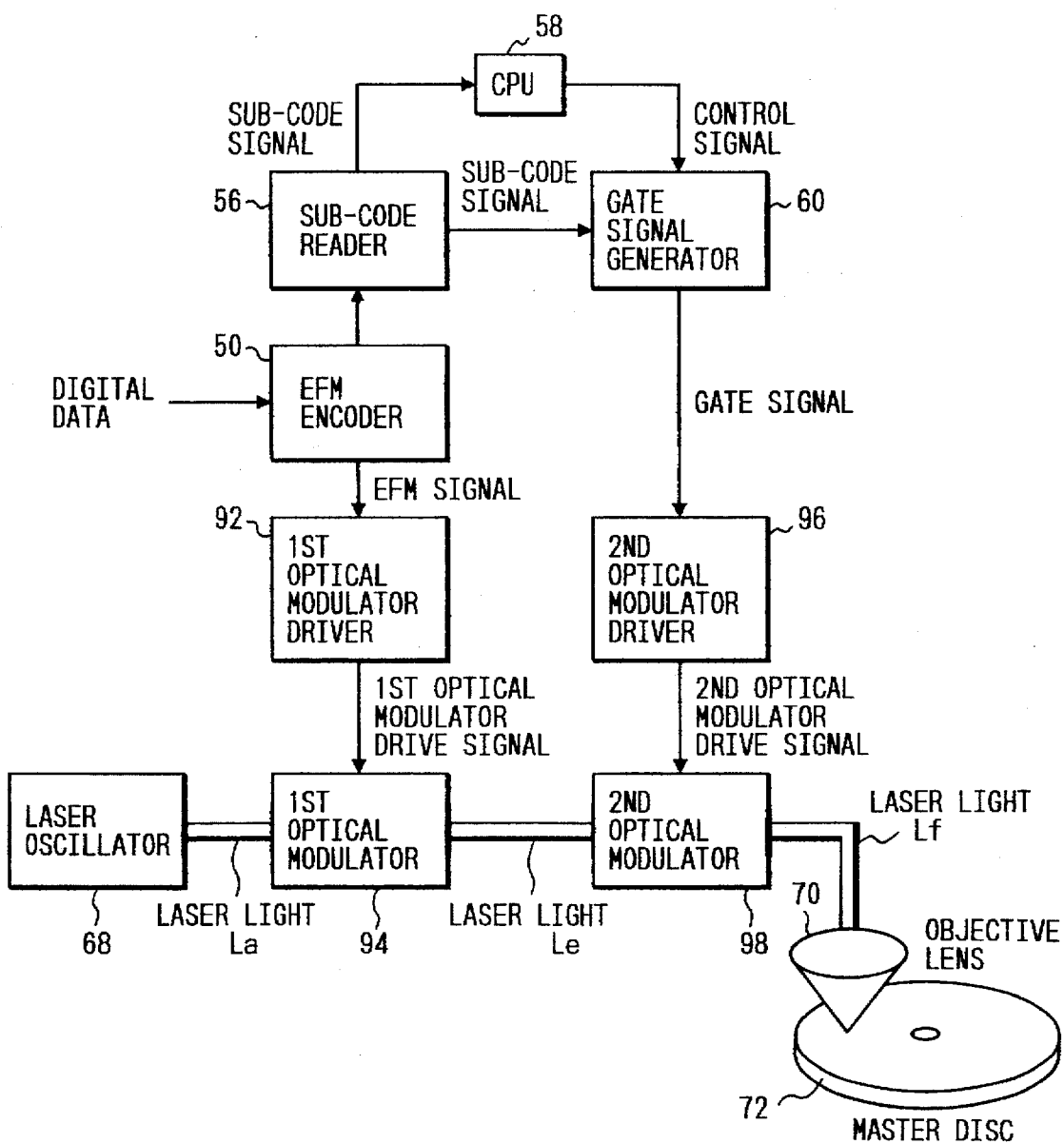

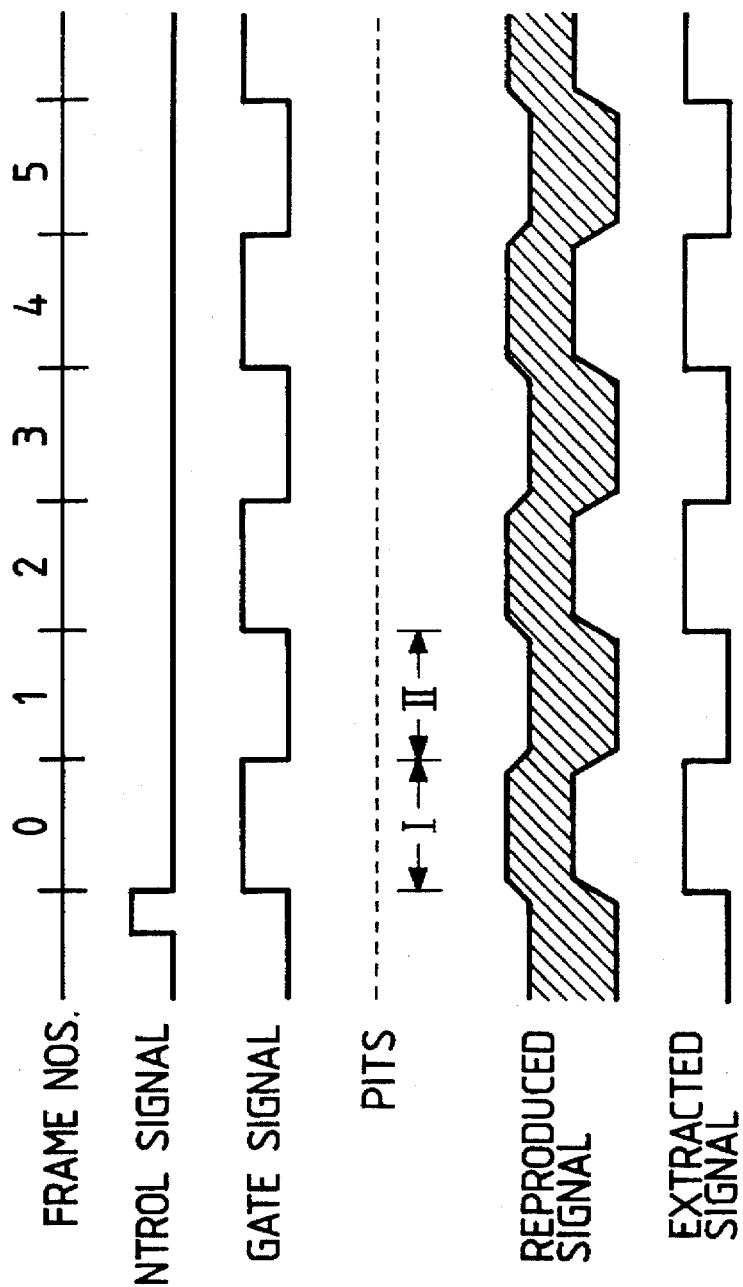

OPTICAL DISC, DEVICE FOR CHECKING OPTICAL DISC AND DEVICE FOR RECORDING INFORMATION ON OPTICAL DISC

This application is a continuation of application Ser. No. 08/222,268 filed Apr. 4, 1994, and now abandoned.

BACKGROUND OF THE INVENTION

1. Field of The Invention

This invention relates to an optical disc for use in, for instance, a CD-ROM (compact disc read-only memory), which can prevent an unauthorized copying (namely, pirating) of information recorded thereon (for example, software of a video game (namely, a computer game)). Further, this invention relates to a checking device for checking an optical disc and determining whether or not the optical disc contains information copied illegally. Moreover, this invention relates to a recording device for recording information on such an optical disc.

2. Description of The Related Art

Generally, both of a digital information signal and an analog information signal can be used to designate same information representing, for example, a piece of music, an image, a character, data or the like. Further, it is well known that when the information is copied (namely, duplicated) from the digital information signal, there is substantially no degradation in transmission quality or characteristics of copied information in comparison with a case of copying the same information from the analog information signal. Thus, a copying of original information represented by a digital information signal (namely, producing duplicate information just as good as original information representing, for instance, a piece of music) now becomes a serious problem in protecting a copyright on original information such as information representing a piece of music. Namely, there are demands for inhibition of or limitation on a duplicating (or copying) of a digital information signal.

For instance, a CD-ROM or the like is manufactured according to a public standard such as an ISO 9860 standard established by International Standard Organization. When a copying of original digital information from an optical disc is prevented in conformity to this standard, a copy protection code is preliminarily recorded on the optical disc. Thus, an optical disc containing such a code is determined as a normal disc. In contrast, if such a code is not contained in an optical disc, this optical disc is determined as an illegal copy disc. Further, appropriate measures are taken (for example, a reproducing of information from such an illegal copy disc is stopped). Furthermore, it is expected that henceforth, a large part of CD-ROMs will be manufactured in accordance with this standard.

However, even in case of employing such a copy protection method, when using a copying device being capable of performing what is called a disc copy (namely, taking an exact copy of data recorded on an optical disc), it is possible to easily produce an optical disc which can be determined as a normal disc. This results in appearances of optical discs which are weak in copy protection. Consequently, illegal copy discs would infest in the market.

Thus, there has been proposed another copy protection method by which a unique standard being different from the aforementioned standard for an optical disc is established and an optical disc manufactured according to such a unique standard can not be read by using software for reading a CD-ROM manufactured according to the ordinary standards such as the ISO 9680 standard. However, even in case of employing this copy protection method, when using a copying device which reads data from an optical disc in physical-frame units and copies the read data onto a compact disc of the write once type (CD-WO) or the like, any optical disc can be copied or duplicated.

Further, in case of what is called a mini-disc (MD) which is a disc medium developed by SONY CORPORATION using a 6.4-cm-diameter optical disc, another copy protection technique called a "serial copy management system" (SCMS) is employed. This SCMS is a technique to refer to a protection code concerning the permissibility of copying data in order to prevent data recorded on an MD from being digitally copied two times or more. Incidentally, the protection code is represented by a part of a digital signal recorded on the MD. Namely, the protection code is preliminarily written to a "total-of-contents" (TOC) area of data recorded on the MD.

Further, (1) if the protection code indicates that there is no protection, data or information can be copied from this MD (namely, a source MD) to a target MD. Moreover, when copied from the source MD to the target MD, a protection code indicating that there is copy protection is written to a TOC area of the target MD.

In contrast, (2) if a protection code written to an MD indicates that there is copy protection, this means that the data recorded on this MD has been copied once and can not be copied again. In this way, a digital signal recorded on an MD is prevented from being digitally copied two times or more.

As above described, in case the technique of the SCMS is used, information representing a protection code is written to an optical disc. Further, a copying device refers to the protection code recorded on an MD and then judges from this protection code whether data or information can be copied from this MD.

However, in case where an information signal recorded on an optical disc (namely, a source optical disc) is read therefrom and exactly copied to another optical disc, not only data but also a protection code is copied to the latter disc. As the result, the data can be copied from the source optical disc to another optical disc any number of times. Consequently, an illegal copying of data, which infringes on a copyright on the data, can not be prevented.

Meanwhile, an integrated circuit (IC) for use in a CD device (for example, a CD player and a CD-ROM drive or the like which are on the market currently) monitors a tracking error. Further, when the tracking error becomes equal to or greater than a predetermined value, the device judges that the device has got a shock. Further, as a countermeasure against the shock, the gain of a servo system of the device is increased. (Incidentally, a practical example of such an IC is "TC9236AF" manufactured by Toshiba Corporation). Alternatively, an IC of another type monitors an amount of light reflected by an optical disc. When the amount of the reflection light changes (namely, decreases or increases) to some extent at a rate equal to or higher than a slew rate, the device judges that there is a stain or defect on the optical disc. Further, as a countermeasure against the sustain or defect, a holding of a phase locked loop (PLL) or a muting is performed. (Incidentally, a practical example of such an IC is "AN88035B" manufactured by Matsushita Electric Industrial Co., Ltd).

Therefore, a copy protection can be achieved by effectively utilizing the functions of such a conventional IC without designing a special circuit. The present invention is created in view of the aforesaid matters.

It is, accordingly, an object of the present invention to provide an optical disc, from which protection information included in a signal recorded thereon can not be read merely by performing a conventional method to reproduce the recorded signal, whereby an illegal copying of data therefrom can be prevented effectively.

Further, it is another object of the present invention to provide a checking device for checking such an optical disc which can effectively prevent an illegal copying of data therefrom.

Moreover, it is still another object of the present invention to provide a recording device for recording data or information on such an optical disc which can effectively prevent an illegal copying of the data or information therefrom.

SUMMARY OF THE INVENTION

To achieve the foregoing object and in accordance with a first aspect of the present invention, there is provided an optical disc which comprises a number of spiral trains of regular pits and at least one train of irregular (or abnormal) pits, the regular (or normal) pits of each of the trains being arranged symmetrically with respect to the center of a track (hereunder sometimes referred to as a track center), each of the irregular pits having a predetermined shape different from a shape of each of the regular pits, an arrangement of the train of the irregular pits being differently from an arrangement of each of the trains of the regular pits, a tracking error signal being obtained from the train of the irregular pits.

Further, in accordance with a second aspect of the present invention, there is provided an optical disc which comprises a number of spiral trains of regular pits and at least one train of irregular pits, the regular pits of each of the trains being arranged symmetrically with respect to the track center, each of the irregular pits having a predetermined shape different from a shape of each of the regular pits, an arrangement of the train of the irregular pits being differently from an arrangement of each of the trains of the regular pits, the symmetry of the waveform of an RF signal varying due to the train of the irregular pits.

Moreover, in accordance with a third aspect of the present invention, there is provided an optical disc which comprises a number of spiral trains of regular pits and at least one train of irregular pits, the regular pits of each of the trains being arranged symmetrically with respect to the track center, each of the irregular pits having a predetermined shape different from a shape of each of the regular pits, an arrangement of the train of the irregular pits being differently from an arrangement of each of the trains of the regular pits, a light amount signal varying due to the train of the irregular pits.

Furthermore, in accordance with a fourth aspect of the present invention, there is provided an optical disc which comprises a number of spiral trains of regular pits and at least one train of irregular pits, the regular pits of each of the trains being arranged symmetrically with respect to the track center, each of the irregular pits having a predetermined shape different from a shape of each of the regular pits, the irregular pits being arranged intermittently on a predetermined area correspondingly to data blocks represented by a modulation signal recorded as the trains of the regular pits.

Further, in accordance with a fifth aspect of the present invention, there is provided a checking device for checking an optical disc having a number of spiral trains of regular pits and at least one train of irregular pits, the regular pits of each of the trains being arranged symmetrically with respect to the track center, each of the irregular pits having a predetermined shape different from a shape of each of the regular pits, an arrangement of the train of the irregular pits being differently from an arrangement of each of the trains of the regular pits, which device comprises reproducing means for reproducing an area on which the train of the irregular pits are arranged, and judgement means for detecting the presence or absence of a train of irregular pits from a result of the reproduction and for judging from a result of a detection which of a normal disc and an illegal copy disc the optical disc to be checked is.

Moreover, in accordance with a sixth aspect of the present invention, there is provided a recording device for recording data on an optical disc having a number of spiral trains of regular pits and at least one train of irregular pits, the regular pits of each of the trains being arranged symmetrically with respect to the track center, each of the irregular pits having a predetermined shape different from a shape of each of the regular pits, the irregular pits being arranged intermittently on a predetermined area correspondingly to data blocks represented by a modulation signal recorded as the trains of the regular pits, which device comprises laser light source means for generating and outputting laser light, signal conversion means for converting digital data into a modulation signal, laser-light modulation means for performing an intensity modulation on laser light outputted from the laser light source means according to the modulation signal, gate signal generating means for generating a gate signal in synchronization with each data block represented by the modulation signal, laser light changing means for changing laser light correspondingly to the train of the irregular pits in synchronization with the gate signal and laser light irradiating means for irradiating laser light, which is modulated and changed by the laser light modulation means and the laser light changing means, respectively, onto the optical disk to form a train of pits.

Additionally, primary embodiments of the present invention will be described hereinbelow.

(1) First, in an embodiment (namely, an optical disc) of the present invention, each of the irregular pits of the train is arranged on a center line wobbled in a radial direction by a maximum amplitude smaller than a track pitch.

(2) Further, in this embodiment of the present invention, the wobbling frequency is higher than any frequency of what is called a tracking servo band and is a frequency at which a reproduced signal component included in a tracking error signal becomes minimum and conversely, a wobbling signal carrier becomes maximum when a signal is reproduced by an optical pickup (hereunder sometimes referred to simply as a pickup) using what is called a side beam for tracking.

(3) Furthermore, in the embodiment of the present invention, the train of the irregular pits are arranged or placed on a portion of the disc, where a reproduced signal component included in a tracking error signal becomes small.

(4) Moreover, in the embodiment of the present invention, the duty ratio (or factor) of each of the irregular pits is not equal to that of each of the regular pits.

(5) Furthermore, the width in the radial direction of each of the irregular pits is not equal to that in the radial direction of each of the normal pits.

(6) Further, an embodiment of the checking device for checking an optical device of the present invention has a decoding unit for reading information (or a data block) from an information recording portion of the optical disc and decoding the data block, a first detection unit for detecting whether a servo signal (or a data signal) is normal or abnormal, a second detection unit for detecting whether or not output signals of the decoding unit and the first detection unit are related to each other at a predetermined regular point of time, and a judgement unit for judging from a detection signal outputted from the second detection signal whether or not an irregular pit to be preliminarily recorded on the disc is detected, whereby each volume of the optical disc to be checked can be determined as an optical disc having only regular pits or another optical disc having an irregular pit preliminarily recorded thereon.

(7) Moreover, an embodiment of this checking device has a tracking error signal detection unit for detecting a tracking error signal, a third detection signal for detecting whether the signal level of the tracking error signal is nearly constant or changes like that of a burst signal and a control unit for judging from the tracking error signal whether or not an irregular pit is detected in the read optical disc and for controlling a reproducing operation to be effected after the judgment is made, whereby each volume of the optical disc can be discriminated on the basis of the presence or absence of an irregular pit.

(8) Furthermore, an embodiment of this checking device described in item (7), wherein the pickup employs what is called a three-beam method (namely, a three-spot tracking method), and the third detection comprises a bandpass filter circuit, a rectifying circuit and a comparator circuit, and the center frequency of the bandpass filter circuit is set to be a frequency, at which the level of a burst signal appearing in the tracking error signal becomes maximum and the leakage of a data signal appearing in the tracking error signal becomes minimum.

(9) Additionally, an embodiment of the checking device described in item (6) further has a third detection unit for detecting the symmetry of the waveform of an RF signal with respect to the center or reference level (namely, the slicing level (to be described later)) of the RF signal, a slicing-level changing unit for changing the slicing level of the RF signal according to the detected symmetry, a comparison unit for determining whether or not the change in slicing level is within a reference range and a judgment unit for judging from an output signal of the comparison unit whether or not an irregular pit is detected in the read optical disc, whereby each volume of the optical disc can be discriminated on the basis of the presence or absence of an irregular pit.

(10) Further, another embodiment of the checking device described in item (6) further has an amount-of-reflection-light signal generating unit for irradiating an information recording portion of the optical disc with laser light and outputting an amount-of-reflection-light signal representing an amount of light reflected by the optical disc, a comparison unit for determining whether or not change in the amount-of-reflection-light signal is within a reference range, an expansion unit for expanding an output signal of the comparison unit and a judgment unit for judging from an output signal of the expansion unit whether or not an irregular pit is detected in the read optical disc, whereby each volume of the optical disc can be discriminated on the basis of the presence or absence of an irregular pit.

(11) Moreover, still another embodiment of the checking device described in item (8) further has a third detection unit for reading data recorded at each of predetermined addresses in data block recorded on the optical disc and judging whether or not an irregular pit is detected in the disc, by determining whether or not a tracking error signal changing like a burst signal is detected in synchronization with a regular point of time determined according to data recorded at the read address, or determining whether or not variation in slicing level correspondingly to the symmetry of the waveform of the RF signal with respect to the slicing level thereof is detected in synchronization with the regular point of time, or determining whether or not variation in amount of light reflected by the disc is detected in synchronization with the regular point of time, whereby each volume of the optical disc can be discriminated on the basis of the presence or absence of an irregular pit.

(12) Furthermore, yet another embodiment of the checking device described in item (8) further has a third detection unit for reading data recorded at each of predetermined addresses in data block recorded on the optical disc and judging that an irregular pit is detected in the disc, if it is judged more than a predetermined number of times that a tracking error signal changing like a burst signal is detected in synchronization with a regular point of time determined according to data recorded at the read address, or that variation in slicing level correspondingly to the symmetry of the waveform of the RF signal with respect to the slicing level thereof is detected in synchronization with the regular point of time, or that variation in amount of light reflected by the disc is detected in synchronization with the regular point of time, and if it is judged more than a predetermined number of times that a tracking error signal changing like a burst signal is not detected in synchronization with a regular point of time determined according to data recorded at the read address, or that variation in slicing level correspondingly to the symmetry of the waveform of the RF signal with respect to the slicing level thereof is not detected in synchronization with the regular point of time, or that variation in amount of light reflected by the disc is not detected in synchronization with the regular point of time.

(13) Meanwhile, another embodiment of the checking device described in item (6) further has a storage unit for storing a predetermined address of data block stored in the optical disc, which block is used for determining a kind of the optical disk from a result of judging whether or not an irregular pit is detected among information pits formed on the disk, and a third detection unit for reading the data block recorded at the predetermined address when setting the optical disc and for judging whether or not an irregular pit is detected in the disc, by determining whether or not a tracking error signal changing like a burst signal is detected in the data block, or determining whether or not variation in slicing level of the RF signal is detected in the data block, or determining whether or not variation in level of an amount-of-reflection-light signal is detected in the data block, whereby each volume of the optical disc can be discriminated on the basis of the presence or absence of an irregular pit.

(14) Further, still another embodiment of the checking device described in item (6) further has a storage unit for storing a predetermined address, at which a table of addresses of data block is stored in the optical disc, the data block being used for determining a kind of the optical disk from a result of judging whether or not an irregular pit is detected among information pits formed on the disk, and a third detection unit for reading the table at the predetermined address, and next reading the data block stored at the address listed in the table when setting the optical disc and for judging whether or not an irregular pit is detected in the disc, by determining whether or not a tracking error signal changing like a burst signal is detected in the data block, or determining whether or not variation in slicing level of the RF signal is detected in the data block, or determining whether or not variation in level of an amount-of-reflection-light signal is detected in the data block, whereby each volume of the optical disc can be discriminated on the basis of the presence or absence of an irregular pit.

(15) An information recording device which comprises a laser light source, conversion means for converting digital data into a modulation signal, modulation means for performing an intensity modulation on laser light emitted from the laser light source according to the modulation signal to thereby convert the laser light into recording laser light, an objective lens for irradiating an optical disc with the recording laser light and for forming trains of pits on the optical disc, gate signal generating means for generating a gate signal in synchronization with each data block represented by the modulation signal and irregular-pits generating means for generating a train of irregular pits in synchronization with the gate signal.

(16) Further, another information recording device which comprises a laser light source, conversion means for converting digital data into a modulation signal, modulation means for performing an intensity modulation on laser light emitted from the laser light source according to the modulation signal to thereby convert the laser light into recording laser light, an objective lens for irradiating an optical disc with the recording laser light and for forming trains of pits on the optical disc, gate signal generating means for generating a gate signal in synchronization with each data block represented by the modulation signal, wobbling-signal generating means for generating a wobbling signal in synchronization with the gate signal and shifting means for shifting a laser spot of the recording laser light, which spot is formed on the optical disc, in the radial direction thereof according to the wobbling signal.

(17) Moreover, still another information recording device which comprises a laser light source, conversion means for converting digital data into a modulation signal, modulation means for performing an intensity modulation on laser light emitted from the laser light source according to the modulation signal to thereby convert the laser light into recording laser light, an objective lens for irradiating an optical disc with the recording laser light and for forming trains of pits on the optical disc, gate signal generating means for generating a gate signal in synchronization with each data block represented by the modulation signal, and duty-factor changing means for changing the duty factor of the modulation signal according to the gate signal.

(18) Furthermore, yet another information recording device which comprises a laser light source, conversion means for converting digital data into a modulation signal, modulation means for performing an intensity modulation on laser light emitted from the laser light source according to the modulation signal to thereby convert the laser light into recording laser light, an objective lens for irradiating an optical disc with the recording laser light and for forming trains of pits on the optical disc, gate signal generating means for generating a gate signal in synchronization with each data block represented by the modulation signal, and width changing means for changing the width in the radial direction of the train of the pits according to the gate signal.

Thus, in an optical disc of the present invention, at least one irregular pit is formed between regular or normal pits. Further, a tracking error signal is obtained from this irregular pit. Moreover, a light amount signal changes due to the irregular pit. This is utilized to detect the irregular pit. Such an irregular pit can not be copied even when a normal optical disc containing such an irregular pit is copied by performing a conventional copying method. Thus, an illegal copy disc can be discriminated from a normal optical disc by checking whether or not an irregular pit is included in an optical disc. Consequently, a good copy protection can be achieved by easily detecting an illegal copy disc.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 4 is a flowchart for illustrating an operation of the checking device of FIG. 3;

FIGS. 5(A), 5(B) and 5(C) are diagrams for illustrating the shapes of pits of a second embodiment of the present invention;

FIG. 5(D) is a diagram for illustrating a light amount signal of the second embodiment of the present invention;

FIG. 5(E) is a waveform chart for illustrating the waveform of a signal obtained by adding up light amount signals outputted from two photodetectors of a fifth embodiment of the present invention;

FIG. 5(F) is a waveform chart for illustrating the waveform of a variation-in-amount-of-reflection-light signal of the fifth embodiment of the present invention;

FIG. 6(A) is a diagram for illustrating the shapes of pits of a third embodiment of the present invention;

FIG. 6(B) is a waveform chart for illustrating the waveform of a tracking error signal of the third embodiment of the present invention;

FIGS. 7(A) to 7(E) are diagrams for illustrating the relation between frames and trains of irregular pits of the third embodiment of the present invention;

FIG. 10 is a schematic block diagram for illustrating the configuration of an example of a burst tracking error detection circuit;

FIGS. 11(A) to 11(E) are waveform charts each for illustrating an operation of the burst tracking error detection circuit;

FIGS. 12(A) to 12(E) are diagrams for illustrating the timing of recognition of a wobble signal by a microcomputer in case of the third embodiment of the present invention;

FIGS. 15(A) to 15(C) are diagrams for illustrating trains of irregular pits of a fourth embodiment of the present invention;

FIG. 16 is a diagram for illustrating variation in what is called a "slicing level" of a radio frequency (RF) signal of a fourth embodiment of the present invention;

FIGS. 20(A) to 20(C) are waveform charts each for illustrating an operation of the variation-in-symmetry detecting circuit of the present invention;

FIGS. 22(A) to 22(F) are diagrams each for illustrating an operation of the recording circuit of FIG. 21;

FIG. 26 is a schematic block diagram for illustrating a recording device for recording data on an optical disc (namely, the fifth embodiment) of the present invention; and FIGS. 27(A) to 27(F) are diagrams each for illustrating an operation of the recording device of FIG. 26.

DETAILED DESCRIPTION OF THE PREFERRED EMBODIMENTS

Figure 1:
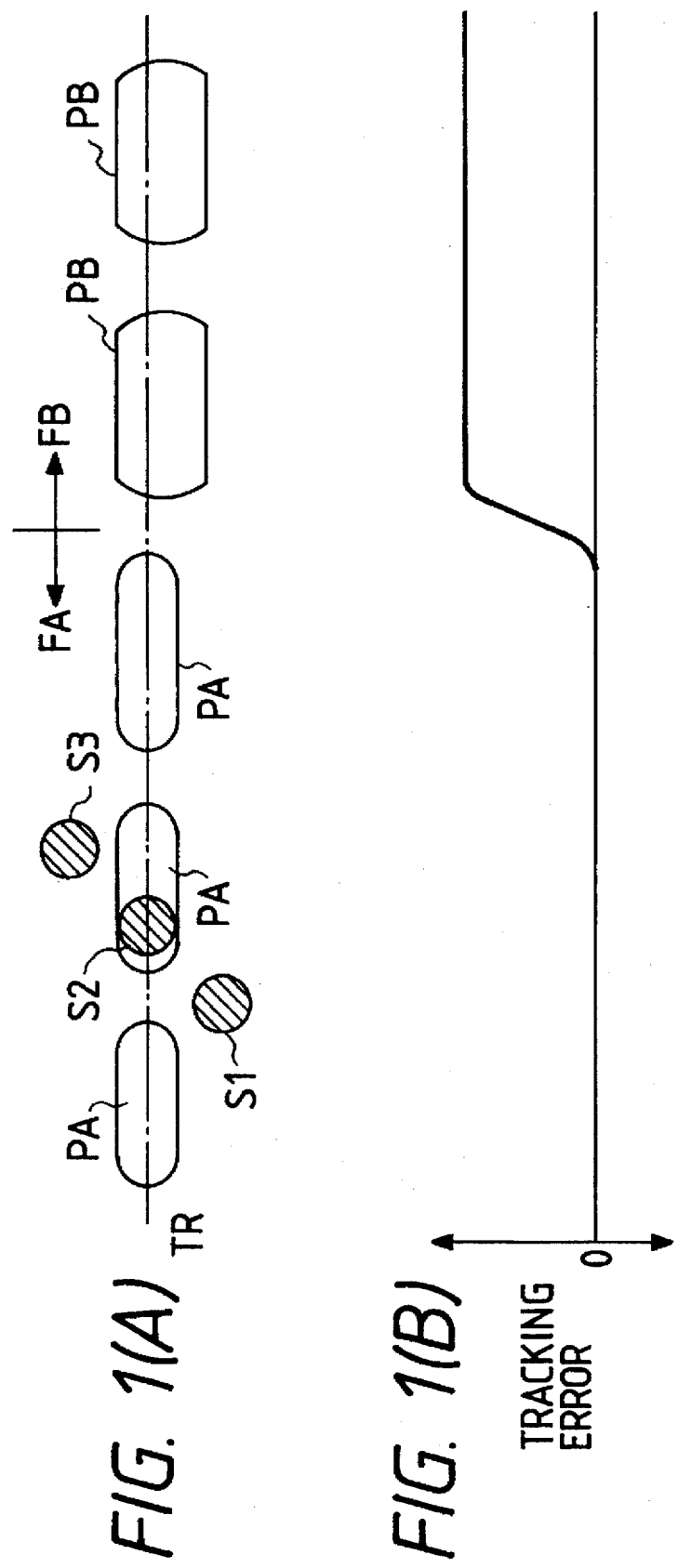
FIG. 1(A) is a diagram for illustrating the shapes of pits of a first optical disc embodying the present invention (namely, a first example of a first embodiment of the present invention)
FIG. 1(B) is a waveform chart for illustrating the waveform of a tracking error signal of the first example of the first embodiment of the present invention.
Figure 2:
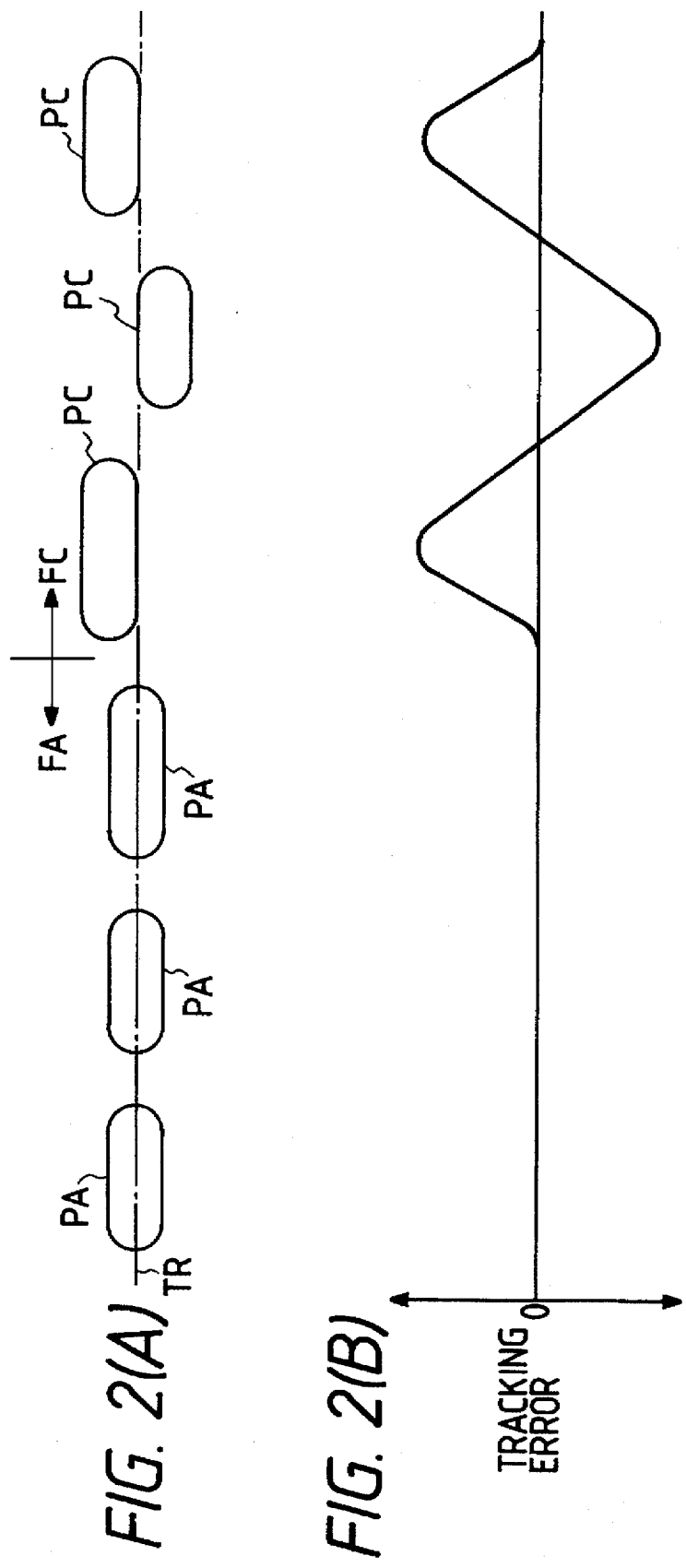
FIG. 2(A) is a diagram for illustrating the shapes of pits of a second optical disc embodying the present invention (namely, a second example of the first embodiment of the present invention)
FIG. 2(B) is a waveform chart for illustrating the waveform of a tracking error signal of the second example of the first embodiment of the present invention.

Hereinafter, the preferred embodiments of the present invention (namely, optical discs, checking devices and recording devices according to the present invention) will be described in detail by referring to the accompanying drawings.

Embodiment 1

Hereinafter, a first embodiment of the present invention will be described in detail by referring to FIGS. 1(A) and 1(B) to FIG. 4. In case of the first embodiment of the present invention, a normal optical disc is discriminated from an illegal copy disk by increasing tracking errors of the normal optical disc intentionally.

① Optical Disc

FIG. 1(A) illustrates a first example of the shape of each pit of the first embodiment (namely, an optical disc) of the present invention. Further, FIG. 1(B) illustrates the waveform of a tracking error signal obtained when reading information represented by the pits of this optical disc. In FIG. 1(A), pits PA shown in a left region indicated by an arrow FA are formed in conformity with an ordinary standard. Moreover, as shown in this figure, the shape of each of the pits PA is symmetrical with respect to the central line (namely, the track center) of a track TR. Furthermore, the width of an upper part of each of the pits PA, which part stands on the central line of the track TR, is equal to that of a lower part thereof, which part is below the central line of the track TR, as viewed in this figure. In contrast, in case of each of pits PB which are shown in a right region indicated by an arrow FB, the width of one of upper and lower parts (in case of this example, the lower part below the central line of the track TR) of each of the pits PA is larger than that of the other part thereof, as also viewed in this figure.

On the other hand, as is well known, a tracking error signal is obtained by irradiating the train of the pits with what are called laser beam spots (namely, tracking spots) S1 to S3 used in what is called the three-beam method (namely, the three-spot tracking method) and next performing a subtraction between amounts of light reflected by the two wobbled spots S1 and S3. In case of the train of the pits of FIG. 1(A), the shape of each of the regular or normal pits PA formed in the region indicated by the arrow FA is symmetric with respect to the track TR, as described above. Therefore, the amount of light reflected by the spot S1 is substantially equal to that of light reflected by the spot S3. Consequently, the level of a tracking error signal obtained from the region indicated by the arrow FA is nearly equal to "0", as illustrated in FIG. 1(B).

However, in the region indicated by the arrow FB, the shape of each of the pits PB is asymmetric with respect to the track TR. Thus, the amount of light reflected by the spot S1 becomes unequal to that of light reflected by the spot S3. Consequently, the tracking error is increased, with the result that the waveform of the tracking error signal obtained from the region indicated by the arrow FB becomes as shown in FIG. 1(B).

Turning to FIG. 2(A), there is shown a second example of the shape of each of pits of the optical disc (namely, the first embodiment) of the present invention. Further, FIG. 2(B) illustrates the waveform of a tracking error signal obtained when reading information represented by the pits of this optical disc. As shown in FIG. 2(A), pits PA shown in the left region indicated by the arrow FA are formed in conformity with the ordinary standard, similarly in case of the first example. In contrast with this, pits PC of the right region indicated by the arrow FC are arranged in a wobbling manner with respect to the track TR but have shapes similar to those of the pits PA of the left region.

When such a pit train is irradiated with laser beams similarly as in case of the first example, the level of a tracking error signal obtained from the region indicated by the arrow FA is almost equal to "0", as illustrated in FIG. 2(B). However, in the region indicated by the arrow FC, the pits PC are displaced from the track TR as shown in FIG. 2(A). As a consequence, the amount of light reflected by the spot S1 becomes unequal to that of light reflected by the spot S3. Thus, the tracking error is increased, with the result that the waveform of the tracking error signal obtained from the region indicated by the arrow FC becomes as shown in FIG. 2(B).

In case of the first embodiment, the optical disc contains at least one of the trains or groups of the pits PB and PC (namely, the groups of irregular pits) in addition to the group of the pits PA (namely, the group of normal or regular pits), which are shaped and arranged as described above. Incidentally, in a data format, such irregular pits (namely, pits which cause tracking errors) are formed at positions where such irregular pits do not affect data which should be originally recorded on the disc (namely, original data represented by normal or regular pits). Further, the length of each abnormal (or irregular) pit is set such that a reproducing operation should not be interrupted by a tracking error signal generated due to the irregular pits.

Additionally, it is preferable to form irregular pits at a plurality of positions on an optical disc. This is because an illegal copy disk may be taken for a normal disc in case where only one irregular pit is formed at a position on the disc and moreover the illegal copy disk has a stain or a scratch. Apparently, the more irregular pits are formed on the disc, the less mistakes are made.

Incidentally, even if a single-beam push-pull tracking method is employed instead of the three-spot tracking method, similar results can be obtained.

② Checking Device

Next, a checking device of the present invention will be described hereunder by referring to FIG. 3. This figure illustrates a primary part of the checking device relating to the first embodiment. As shown in this figure, the aforementioned irregular pits DP are formed at, for instance, addresses AD1 to AD3 in an optical disc 10. Further, a reproducing device for reproducing information from the disc 10 is provided with a setting-of-optical-disc detection unit 12 which detects whether or not an optical disc is set. Moreover, the optical disc 10 is driven under control of a disc drive portion 14. Furthermore, a pickup 16 for outputting the aforesaid three laser beams and detecting the light reflected from the three spots is driven under control of a pickup drive portion 18.

Further, a beam detection output of the pickup 16 is connected to a head amplifier circuit 20 which outputs a light amount signal and a tracking error signal. These signals are supplied to a signal processing circuit 22. Moreover, a microcomputer 24 is connected to the signal processing circuit 22 and is supplied with the tracking error signal from the circuit 22. Furthermore, data representing the addresses AD1 to AD3 at which the irregular pits are formed is stored in a memory 26 provided in the microcomputer 24. Additionally, the microcomputer 24 is connected to a display unit 28 in addition to the disc drive portion 14 and the pickup drive portion 18.

Next, an operation of the cheking device according to the first embodiment will be described hereinafter by referring to a flowchart of FIG. 4. First, the optical disc 10 is set and then the set disc 10 is detected by the setting-of-optical-disc detection unit 12. At that time, the completion of the setting of the optical disc 10 is notified to the microcomputer 24 in step SA. Then, in response to the notification, the microcomputer 24 reads the data preliminarily stored in the memory 26, which data represents the addresses AD1 to AD3, at which the irregular pits are formed. Subsequently, the microcomputer 24 sends driving instructions to the disc drive portion 14 and the pickup drive portion 18, respectively. Thus, the train of the irregular pits formed at the address AD1 are read. Namely, the disc 10 and the pickup 16 are driven by the portions 14 and 16, respectively, and the irregular pits formed at the address AD1 are irradiated with three laser beam spots.

Then, light reflected from each of the beam spots is received by the pickup 16. Subsequently, the received reflection light is further converted by the pickup 16 into an electric signal. Thereafter, this electric signal is supplied (namely, inputted) to the head amplifier circuit 20, whereupon a tracking error signal and a light amount signal are obtained from the input signal. Then, the tracking error signal is supplied from the signal processing circuit 22 to the microcomputer 24.

Figure 3:
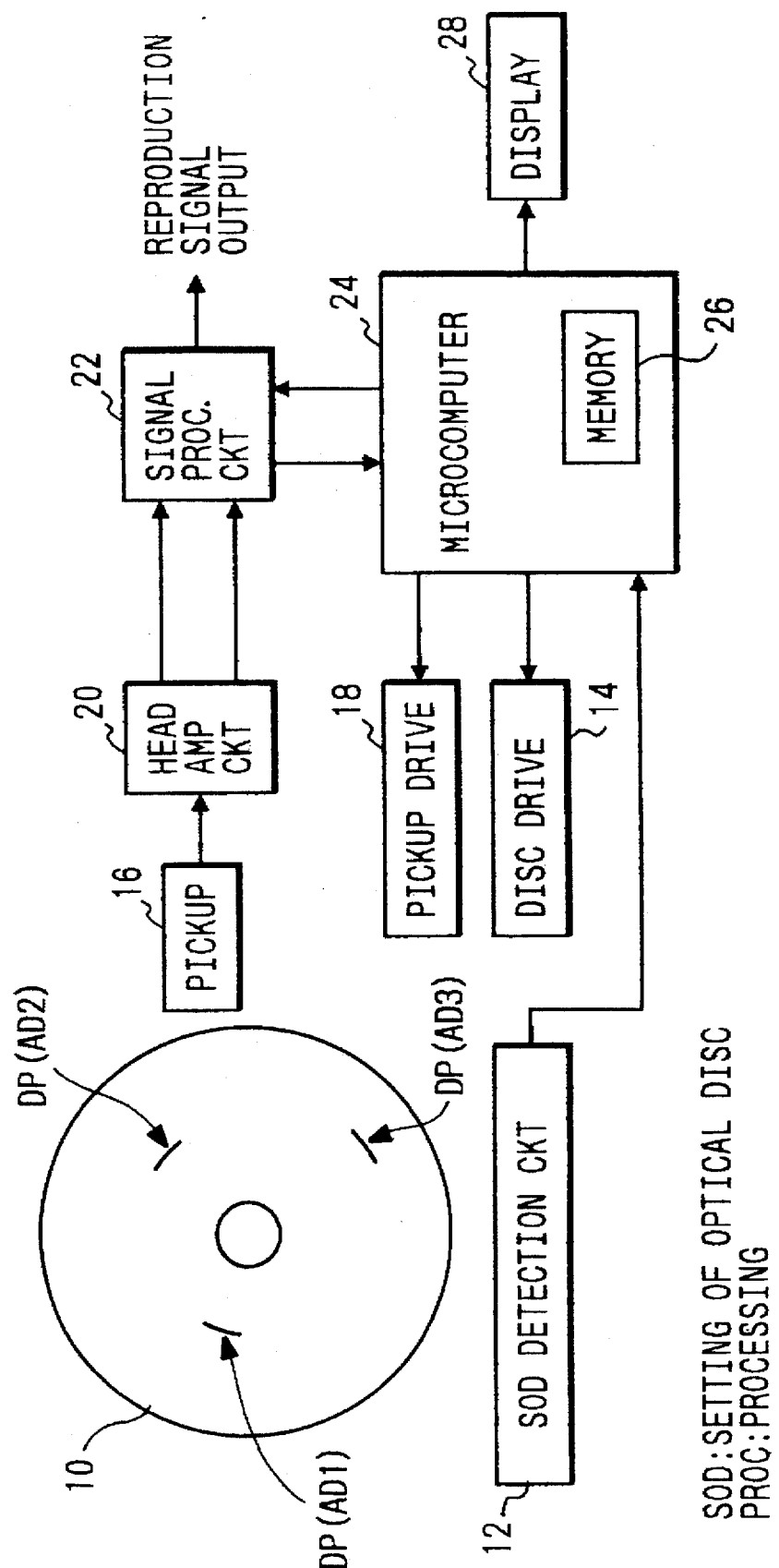
FIG. 3 is a schematic block diagram for illustrating the configuration of a checking device embodying the present invention.

As stated above, the level of the tracking error signal is increased at the irregular pits DP of FIG. 3. Thus, this phenomenon is utilized for detecting the irregular pits DP in step SB. Such an operation of detecting the irregular pits DP is sequentially performed on the pits formed at the addresses AD2 and AD3. Further, when the irregular pits DP are detected at the addresses AD1 to AD3 in step SC, the microcomputer 24 judges that the optical disc 10 is a normal disc. Thereafter, a usual reproducing operation is performed in step SD.

Next, an operation of reproducing data from an optical disc which is a copy disc of the normal disc 10 will be described hereunder. When a copy disc of the normal disc (namely, a source disc) 10 is produced, signals recorded on the normal disc 10 are first reproduced by using, for example, a CD-ROM drive. Moreover, reproduction signals obtained by reproducing the signals recorded on the disc 10 are then recorded on a target optical disc such as a CD-WO or the like. In this case, the data is copied to the target optical disc by performing an error correction on a portion thereof corresponding to the irregular pits. Therefore, the target optical disc contains no irregular pits. Seemingly, the target optical disc appears to be a copy disc to which all information recorded on the normal source disc is copied perfectly. However, in fact, the target optical disc includes no irregular pits.

When such a target optical disc is set in the reproducing device of FIG. 3, the addresses AD1 to AD5 are accessed similarly. Then, an operation of detecting a tracking error signal is effected. However, as above described, the target optical disc contains no irregular pits. Therefore, no tracking error signal is detected from the target optical disc. Consequently, in step SE, the microcomputer 24 judges that this disc is not a normal copy disc (namely, is not a legal copy disc). Further, the microcomputer 24 instructs the display unit 28 to display a message indicating this fact. Moreover, the microcomputer 24 instructs the signal processing circuit 22 to stop outputting a signal.

In this way, the reproducing operation is ceased in case that the the target optical disc is not a legal copy disc (namely, contains no irregular pits). As the result, an illegal copying of data from an optical disc can be prevented practically. Incidentally, even if a copying device for copying data from a source disc to a target disc in physical-frame units is used, a copying operation is performed by inserting some suitable data into a portion in which a tracking error occurs. Therefore, when data is reproduced from a copy disc obtained by such a copying device, no tracking error is obtained from a portion corresponding to the irregular pits of the source disc. Thus, a reproducing of data from such an illegal copy disc can be prevented practically.

Moreover, in case where a reproducing device for reproducing data from an optical disc is not provided with the aforementioned checking device, or in case where information or data representing addresses of irregular pits is erroneous, when trying to read the optical disc, a seek error or a data error occurs due to the irregular pits and thus the device stops. Namely, in case of the first embodiment of the present invention, a reproducing device should have a predetermined function to prevent an occurrence of a seek error or a data error due to irregular pits. In this point of view, a copy protection can be reinforced.

Embodiment 2

Next, a second embodiment of the present invention will be described in detail by referring to FIGS. 5(A) to 5(D). Further, in these figures, like reference characters designate like or corresponding composing parts of the first embodiment. In case of the second embodiment of the present invention, a normal optical disc is discriminated from an illegal copy disk by increasing an amount of reflection light of the normal optical disc intentionally.

FIGS. 5(A) to 5(C) illustrate the shapes of pits of an optical disc (namely, the second embodiment) of the present invention. In these figures, pits PA of left and right regions indicated by the arrows FAs are formed in conformity with an ordinary standard. In contrast, a region indicated by an arrow FD (for instance, a region including pits PD) is a characteristic portion of the second embodiment of the present invention. In case of an example of FIG. 5(A), the length of each of the pits PD is set to be shorter than a minimum distance 3T (incidentally, character T denotes a data bit time) employed in an eight-to-fourteen modulation (EFM). Further, in case of another example of FIG. 5(B), the region indicated by the arrow FD is a mirror mark PE without forming pits PD. Moreover, in case of a further example of FIG. 5(C), the pits PF are made to be shallow by changing an exposure (namely, a light exposure) employed by an exposure system (not shown). Incidentally, hereunder, the mirror mark will be sometimes referred to as an irregular or abnormal pit, for convenience of description.

In case of the second embodiment, a light amount signal such as shown in FIG. 5(D) is obtained by irradiating the train of the pits with laser beam spots S1 to S3 and finding an amount of reflection light similarly as in case of the first embodiment. This light amount signal is obtained as a total photoelectric conversion signal outputted from a four-segment light receiving device (not shown) for receiving reflection light from the central spot S2, or as a total of the photoelectric conversion signals outputted from light receiving devices which receive reflection light from the spots S1, S2 and S3, respectively.

In case of the second embodiment, the optical disc contains at least one of the trains or groups of the irregular pits PD, PE and PF, which are shaped and arranged as described above. Incidentally, in a data format, such irregular pits are formed at positions where such irregular pits do not affect data which should be originally recorded on the disc, similarly as in case of the first embodiment. Further, the length of each abnormal (or irregular) pit is set such that a reproducing operation should not be interrupted by a tracking error signal generated due to the irregular pits. Moreover, such irregular pits are formed at a plurality of positions on an optical disc, similarly as in case of the first embodiment.

Furthermore, a checking device for an optical disc of the second embodiment has a configuration similar to that of the checking device for the first embodiment, except that a light amount signal is used instead of the tracking error signal of the first embodiment.

Incidentally, signals illustrated in FIGS. 5(E) and 5(F) will be described later.

Next, practical examples of checking device employing IC for processing a disc signal, which is on the market, will be described hereinbelow. For example, in case of "TC9238AF" manufactured by Toshiba Corporation, the tracking error is continuously monitored. Further, when the absolute value of the difference between a predetermined threshold value and the tracking error exceeds a predetermined value, a detection signal indicating such a fact is outputted. The aforesaid checking operation can be achieved by inputting this detection signal to the microcomputer 24 of FIG. 3. In case of the same IC, when the absolute value of the difference between the level of the light amount signal and that of a slew-rate limiting signal exceeds a predetermined value, a detection signal indicating such a fact is outputted. The aforementioned checking operation can be achieved by inputting this detection signal to the microcomputer 24 of FIG. 3, similarly.

Further, in case of a head amplifier IC "AN88035B" manufactured by Matsushita Electric Industrial Co., Ltd, when a tracking error becomes outside a predetermined range, a detection signal indicating such a fact is outputted. Moreover, when an amount of reflection light increases and the level of an RF signal decreases relatively, another detection signal indicating this fact is outputted. Thus, the aforementioned checking operation can be achieved by utilizing such detection signals.

Embodiment 3

Next, a third embodiment of the present invention will be described in detail hereinbelow by referring to FIGS. 6(A) and 6(B) to FIG. 14.

① Optical Disc

First, the shapes of pits formed in the third embodiment will be described with reference to FIGS. 6(A) and 6(B) to FIG. 14.

FIG. 6(A) illustrates the shapes of what are called "wobbling pits" in case of the third embodiment of the present invention. Further, FIG. 6(B) illustrates the waveform of a tracking error signal obtained when reading the wobbling pits of FIG. 6(A). As shown in FIG. 6(A), the shapes and arrangement of pits of a left region are similar to those of ordinary pits of a CD. Namely, the central line of the train of the pits of the left region is coincident with the central line of a track. In contrast, the central line of the train of irregular pits of the right region is not coincident with a virtual central line of a track, which is indicated by a dotted line in this figure. Thus, the centers of the irregular pits, which deviate from the virtual central line of the track, appear to "wobble".

When a tracking is performed by irradiating the train of such pits of the left region with beam spots S1 to S3 to obtain a tracking error signal, the amounts of light reflected by the spots S1 and S3 become substantially equal to each other and as the result, the level of the tracking error signal becomes equal to "0" In contrast, when the tracking is performed by irradiating the train of such pits of the right region with beam spots S1 to S3, the amounts of light reflected by the spots S1 and S3 become unequal to each other and the level of the tracking error signal increases in proportion to the distance (hereunder sometimes referred to as a deviation amount) from the virtual central line of the track to each of the pits of the right region. Therefore, when the portion or region consisting of the wobbling pits is reproduced, a wobbling signal is obtained as being superposed upon the tracking error signal.

In case of this embodiment, such a wobbling signal is recorded on a predetermined track in data-block units, periodically and intermittently. Hence, if a wobbling signal is obtained in synchronization with each data block of a recording signal (namely, a signal to be recorded) intermittently, the disc can be determined as a normal optical disc. If not, the disc can be determined as an illegal copy disc. As a consequence, an illegal copying can be prevented practically.

Incidentally, it is necessary to limit the deviation amount to a predetermined value sufficient to prevent an occurrence of a seek error due to excessive increase in the tracking error caused by the wobbling pits, as well as an occurrence of what is called a data error (namely, a read error) due to failure in reading data represented by the pits. In case of this embodiment, the deviation amount (namely, the width or distance between the irregular pit and the virtual central line of the track) is set to be equal to or less than 2% or so of a track pitch and is also set to be equal to or less than 5% or so of the width in the radial direction of the pit.

FIGS. 7(A) to 7(D) are diagrams for illustrating an example of the arrangement of the wobbling irregular pits. As shown in these figures, the train of the irregular pits are arranged intermittently in a bursting manner (see FIG. 7(D)) in, for instance, frame units (see FIG. 7(A)). In case of this example, the train of irregular pits are arranged in each even frame, while the train of regular (or normal) pits are arranged in each odd frame. FIG. 7(E) shows the waveform of a tracking error signal representing a tracking error due to the wobbling signal caused by the irregular pits.

Next, the frequency of the wobbling signal due to the irregular pits will be described hereinbelow by referring to FIG. 8. When reproducing data from an ordinary disc by use of the pickup using three-beam-spots, the spectrum of the obtained tracking error signal contains a recording signal component indicated by a curve GA. The level of this recording signal component increases or decreases in a period determined by the distance between the side beam spots S1 and S2 of FIG. 1(A). The recording signal components become noises at the frequencies corresponding to peaks in level thereof (namely, corresponding to points A and C of FIG. 8). Thus, in case of the wobbling signal, no good component-to-noise ratio (C/N) can be obtained (see GB and GC).

Such noises, however, decrease at the frequency corresponding to a valley in level of the recording signal component (namely, corresponding to a point B). Thus, a good C/N can be obtained at the point B (see GB). It is, therefore, very effective in obtaining a good C/N to select a frequency corresponding to a valley in level of the recording signal component (for example, the point B).

Figure 8:
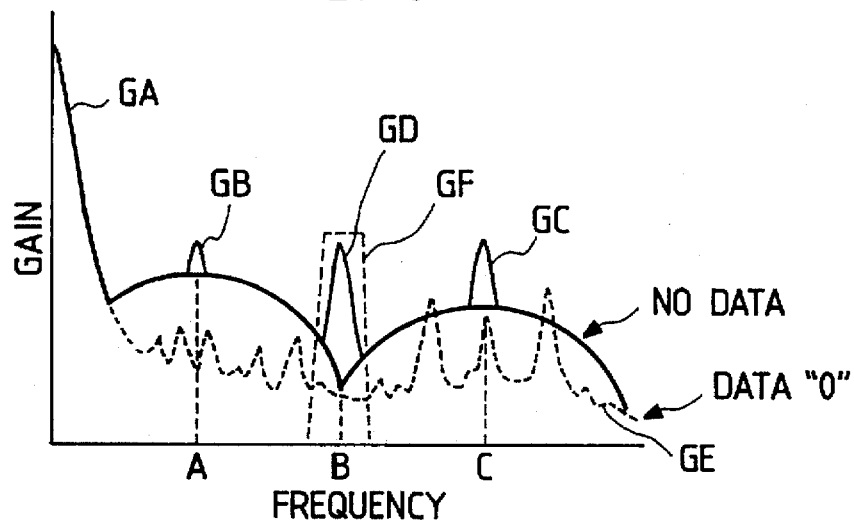
FIG. 8 is a graph for illustrating the relation between a wobbling signal and a noise in case of the third embodiment of the present invention.

Further, in portions having data "0" (for instance, read-in and read-out zones), which are formed on an optical disc, the recording signal component decreases as indicated by a dotted curve GE in FIG. 8. Thus, regarding the wobbling signal, a good C/N can be obtained, similarly. Therefore, it is very fruitful to form in a portion having data of "0" (for example, the read-in or read-out zone) a train of irregular pits which generate wobbling signals.

② Reproduction Device

Figure 9:
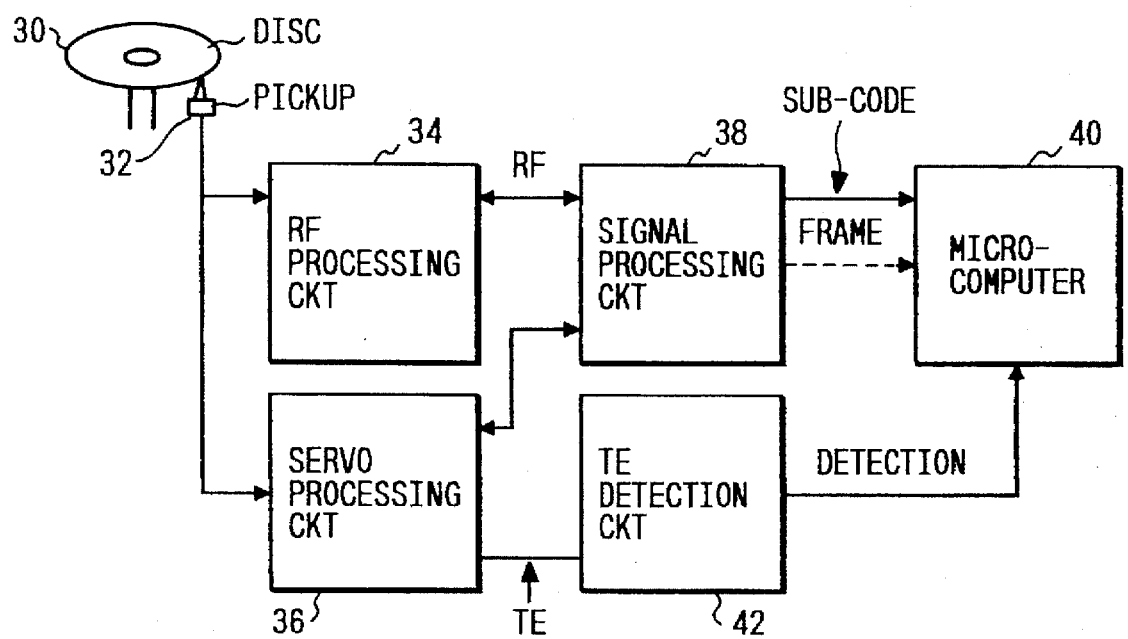
FIG. 9 is a schematic block diagram for illustrating the configuration of a reproduction device for reproducing data from an optical disc (namely, the third embodiment) of the present invention.

Next, a reproduction device for reproducing data recorded on the optical disc according to the third embodiment will be described hereinbelow by referring to FIGS. 9 to 13. FIG. 9 is a schematic block diagram for illustrating the configuration of the reproduction device for reproducing data from the optical disc (namely, the third embodiment) of the present invention, which contains the irregular pits described hereinabove. First, a signal read from the optical disc 30 by a pickup 32 is supplied to an RF processing circuit 34 and a servo processing circuit 36. Then, an RF signal outputted from the RF processing circuit 34 is fed to a signal processing circuit 38. Subsequently, a sub-code and frame information obtained by this circuit are supplied to a microcomputer 40.

Further, in case of an ordinary CD-ROM reproduction device, the servo processing circuit 36 is provided with a tracking error signal detection portion by which an deviation or error in tracking is detected as a tracking error signal. This tracking error signal is supplied to a burst tracking error detection circuit 42, whereupon a burst signal is extracted. Then, the burst signal is fed to the microcomputer 40 as a digital signal.

FIG. 10 illustrates an example of the burst tracking error detection circuit 42. As shown in this figure, the burst tracking error detection circuit 42 consists of a bandpass filter 42A for extracting only a burst signal frequency, a rectifier circuit 42B for converting the burst signal into a direct current (dc) signal, a reference output circuit 42C and a comparator 42D. Further, the bandpass filter 42A has characteristics as indicated by dotted lines GF of FIG. 8. As shown in FIG. 8, the center frequency is set to be the frequency corresponding to the point B in order to extract only a wobbling signal effectively. Incidentally, characteristics of a single-peak notch type may be employed instead of the characteristics of the trapezoid type GF of FIG. 8.

Next, an operation of the burst tracking error detection circuit 42 will be described hereunder by referring to FIGS. 11(A) to 11(B). Further, a tracking error signal generated by a burst due to the train of the irregular pits of each even frame of FIG. 11(A) is outputted from the servo processing circuit 36 of FIG. 9 to the burst tracking error detection circuit 42 as shown in FIG. 11(B). Then, only a predetermined frequency component is extracted from the input error signal in the bandpass filter 42A. Thereby, a noise component is eliminated as shown in FIG. 11(C).

Subsequently, this resultant signal is rectified by the rectifier circuit 42B. Thus an envelope as shown in FIG. 11(D) is extracted and further inputted to an inverting input terminal of the comparator 42D. On the other hand, a reference signal $V_{TH}$ (see FIG. 11(D)) is supplied from the reference output circuit 42C to a non-inverting input terminal of the comparator 42D. Then, the comparator 42D compares the signal inputted to the inverting input terminal thereof with the signal inputted to the non-inverting input terminal thereof and converts the envelope into a digital signal. When a frame is read from the disc 30, the microcomputer 40 refers to (namely, reads) this burst tracking error signal. Further, the microcomputer 40 determines that when the digital signal outputted from the comparator 42D indicates a logical high level (H), there is a burst as illustrated in FIG. 11(E) and that when the digital signal indicates a logical low level (L), there is no burst.

FIG. 12 illustrates the timing of recognizing a wobbling signal by the microcomputer 40. In case of this embodiment, no wobbling signal is recorded in each odd frame of the disc 30, while a wobbling signal is recorded in each even frame thereof. Namely, the recorded wobbling signal is present in alternate frames and thus there is an intermittent arrangement of the wobbling signal on the disc. Incidentally, FIG. 12(A) illustrates frame numbers; FIG. 12(B) the tracking error signal; and FIG. 12(C) the burst tracking error signal of FIG. 11(E).

When the microcomputer 40 receives a frame No. of FIG. 12(D) from the signal processing circuit 38 of FIG. 9, the frame No. is first received in a period QA of FIG. 12(E). Then, the frame No. is recognized in a period QB of this figure. Further, after a predetermined delay time, the burst tracking error signal is read in a period QC of this figure. Moreover, in case of an even frame, a count is made when a wobbling signal is recorded therein. In contrast, in case of an odd frame, a count is made when no wobbling signal is recorded therein. Incidentally, other processings are effected in periods of FIG. 12(E) other than the periods QA, QB and QC.

Next, an operation of discriminating an illegal copy disc from a normal optical disc in case of this embodiment will be described in detail by referring to FIG. 13. First, when a power supply (not shown) is turned on, it is confirmed in step S1 that the disc 30 is set. Then, a TOC region is read in step S2. Further, if it is judged in step S3 that the disc is a data storage (DA) such as a CD, an ordinary audio reproduction is performed in step S4. In contrast, if it is judged in step S3 that the disc is a CD-ROM, an operation of seeking a track, in which a predetermined train of irregular pits are formed, is performed in step S5. Further, after counts are cleared in step S6, a frame and a burst tracking error signal are read in steps S7 and S8, respectively.

If there is a burst in an even frame, the microcomputer 40 increases the count of even frames (hereunder sometimes referred to as the even-frame count) by one. If not, the microcomputer 40 does not change the count of even frames (see steps S9, S10 and S11). Similarly, if there is a burst in an odd frame, the microcomputer 40 increases the count of odd frames (hereunder sometimes referred to as the odd-frame count) by one. If not, the microcomputer 40 does not change the count of odd frames (see steps S9, S12 and S13). The aforesaid operation is repeated until a predetermined frame is read (see step S14).

As the result, if each of the even-frame count and the odd-frame count is equal to or more than a predetermined number (see steps S15 and Y-branch issued from step S16), it is judged in step S17 that the optical disc 30 is a normal disc. Then, an ordinal ROM reproduction operation (for example, an operation of reproducing a program for a computer game) is started. In contrast, if at least one of the even-frame count and the odd-frame count is less than the predetermined number (see steps S15 and N-branch issued from step S16), it is judged in step S17 that the optical disc 30 is a normal disc. Then, the rotation of the disc 30 is stopped and further the disc 30 is ejected in steps S19 and S20, respectively.

Incidentally, this algorithm is applied to a case where only one train of wobbling pits (namely, irregular pits) correspondingly to the address sought in step S5 are included in the disc 30 (namely, there is only one storage area, in which a train of wobbling pits are formed, in the disc 30). However, if the number of storage areas, in each of which a train of wobbling pits are formed, in the disc 30, the probability of misjudging an illegal copy disc as a normal disc due to a defect or a stain on the disc can be reduced. Thereby, an optical disc can be checked more accurately.

Figure 13:
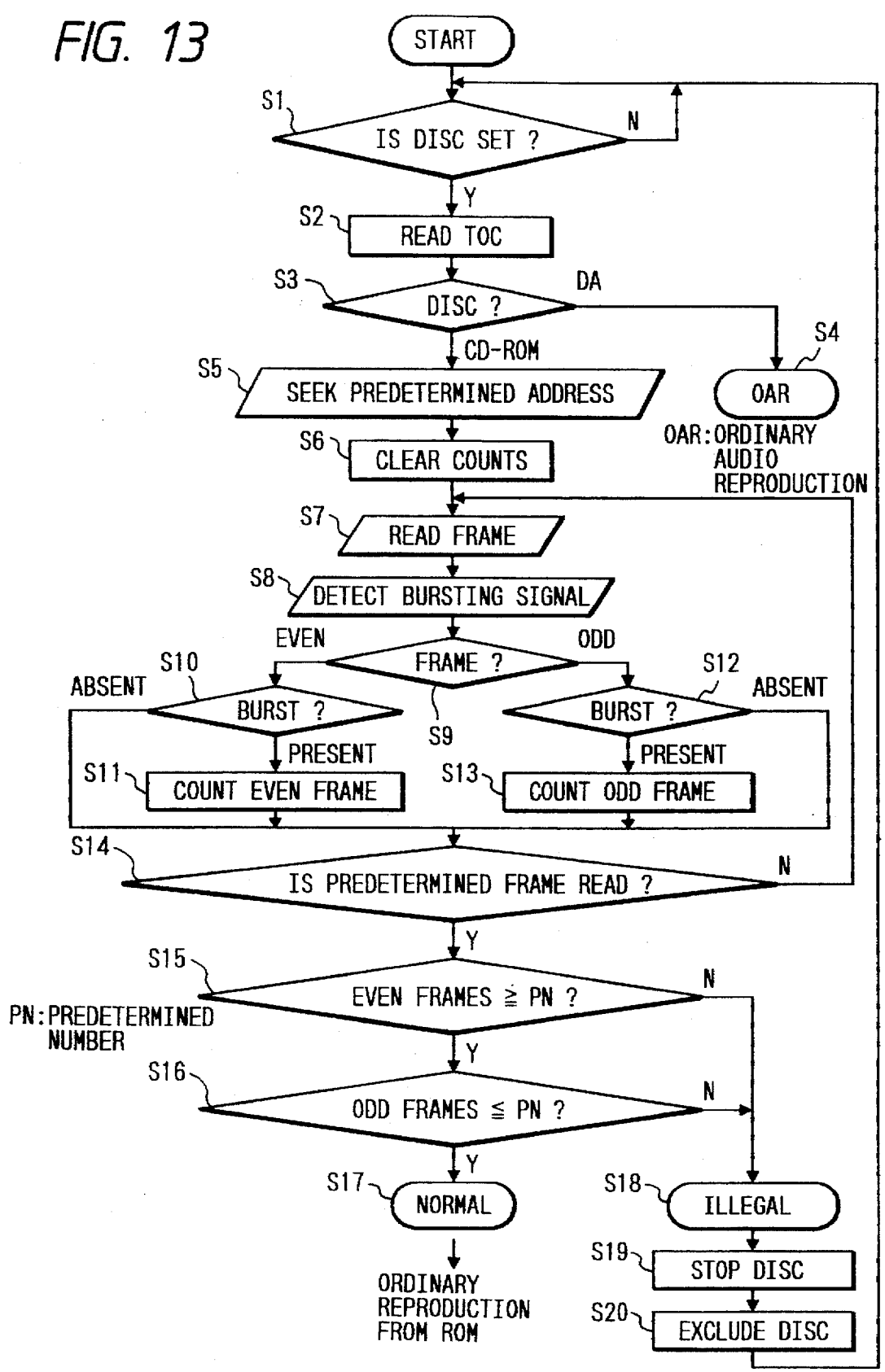
FIG. 13 is a flowchart for illustrating an operation of the reproduction device for reproducing data from an optical disc (namely, the third embodiment) of the present invention.

In case of the example of FIG. 13, the address of the wobbling track is preliminarily stored in the reproduction device. The optical disc, however, may be adapted to have a plurality of wobbled tracks and a storage area for storing a table of addresses of the plurality of the wobbled tracks. Thus, the reproduction device may be adapted to store only an address on each disc, at which the table is recorded. In such a case, the reproduction device first seeks (namely, accesses) a track corresponding to the address, at which the table is recorded, and then reads the table. Subsequently, the reproduction device accesses the plurality of the wobbling tracks and detects the wobbling pits. By employing this technique, a copy code detection operation becomes hard to know, when such a table can not be deciphered. Namely, analyses of the disc and the reproduction device for realizing an undetectable illegal copy disc can be very difficult.

Thus, in accordance with the reproduction device of this embodiment, when an optical disc containing an irregular pit is read by using an ordinary CD-ROM drive in order to copy such a disc, data other than the irregular pit is copied correctly onto a target disc such as a CD-WO and, apparently, no error in copying the disc does not occur. Moreover, a large number of copy discs can be produced by using this target disc as a master disc.

However, although the data is copied to the target disc correctly, the irregular pits can not be copied thereto. As the result, when trying to reproduce the data from this target disc (namely, an illegal copy disc) by using the reproduction device according to this embodiment, no tracking error is not detected at the predetermined address and thus the reproduction is not performed. Consequently, the illegal copy disc can be excluded effectively. This does hold in cases of embodiments which will be described hereinbelow. Incidentally, as previously described, in case where a reproduction device for reproducing data from an optical disc is not provided with the aforementioned checking device, or in case where information or data representing addresses of irregular pits is erroneous, when trying to read the optical disc, a seek error or a data error occurs due to the irregular pits and thus the device stops. Further, such a reproducing device should have a predetermined function to prevent an occurrence of a seek error or a data error due to irregular pits. Consequently, a copy protection can be reinforced.

③ Recording Device

Figure 14:
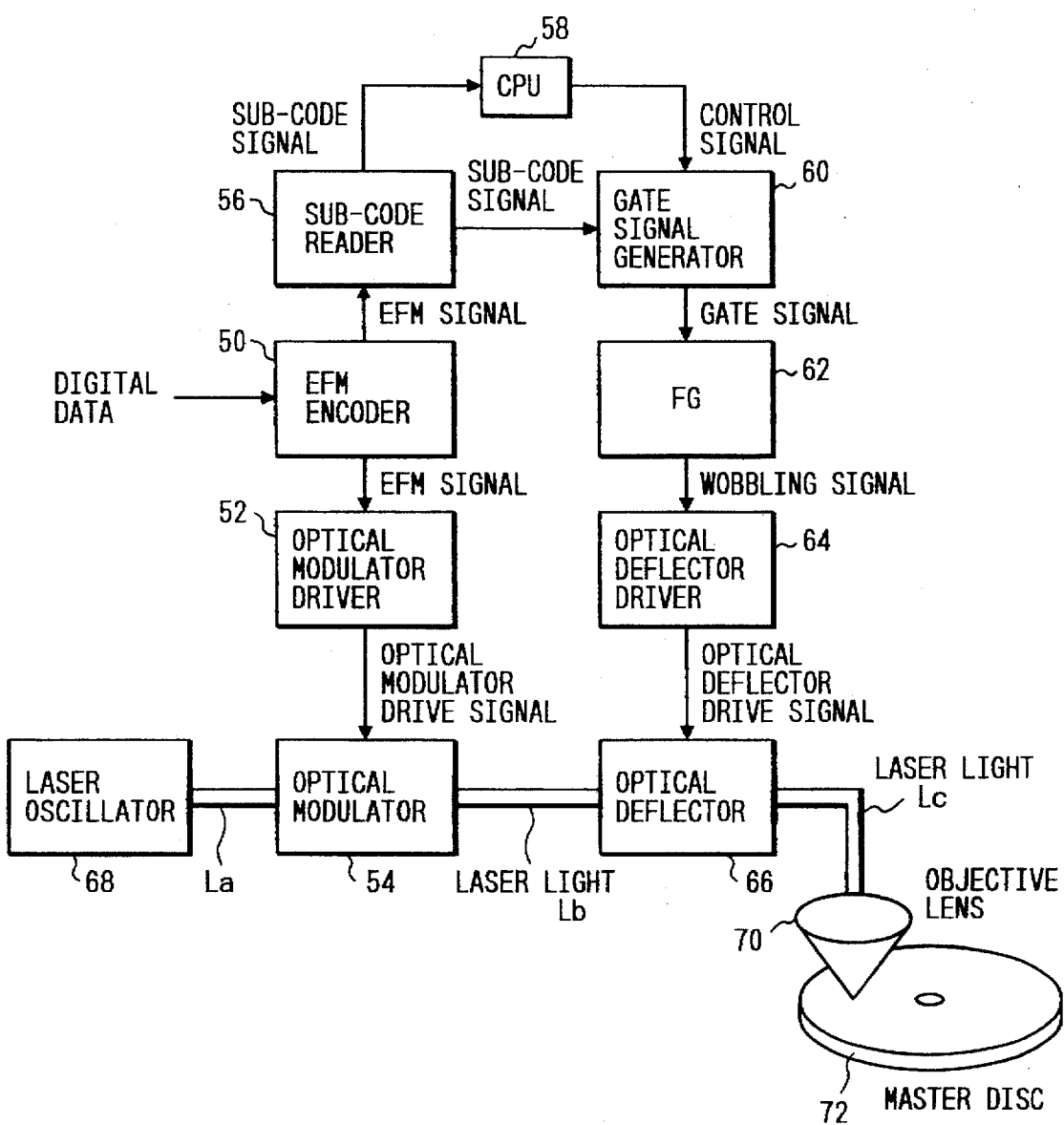
FIG. 14 is a schematic block diagram for illustrating the configuration of a recording device for recording data on an optical disc (namely, the third embodiment) of the present invention.

Next, a recording device (namely, a mastering machine or device) for obtaining an optical disc of this embodiment will be described in detail by referring to FIG. 14. As illustrated in this figure, digital data used to protect, for instance, software for a game is inputted to an EFM encoder 50 which converts the data into an EFM signal and then outputs the EFM signal. On one hand, the EFM signal is inputted to an optical modulator (namely, a light modulator) driver 52. Then, an optical modulator drive signal is outputted from the driver 52 to an optical modulator 54.

On the other hand, the EFM signal is inputted to a sub-code reader 56 which extracts a sub-code signal from the EFM signal and outputs the extracted sub-code signal. This sub-code signal is inputted to a central processing unit (CPU) 58 and a gate signal generator 60. The CPU 58 constantly monitors address information represented by the sub-code signal and generates and outputs a control signal (see FIG. 7(B)) when the sub-code signal comes to represent a predetermined address at which a protection code should be recorded. This control signal is inputted to the gate signal generator 60.

When receiving the control signal from the CPU 58, the gate signal generator 60 generates a gate signal (see FIG. 7(C)) which is synchronized with a sub-code frame. This gate signal corresponds to a protection code. In case where the sub-code frame is, for example, an odd frame, the gate signal has a low signal level corresponding to a logical value of L (namely, a low level). Further, in case where the sub-code frame is an even frame, the gate signal has a high signal level corresponding to a logical value of H (namely, a high level). Incidentally, it is apparent that in case where the sub-code frame is an odd frame, the gate signal may have a high level corresponding to a logical value of H and, in case where the sub-code frame is an even frame, the gate signal may have a low level corresponding to a logical value of L. Such a gate signal is inputted to a frequency generator (FG) 62.

Further, when the gate signal has a high level "H" (namely, in case of an even frame), the FG 62 generates a sinusoidal wave having a predetermined frequency. However, when the gate signal has a low level "L" (namely, in case of an odd frame), the FG 62 generates no wave. Therefore, a signal outputted from the FG 62 becomes a burst wobbling signal (see FIG. 7(D)) which is synchronized with the sub-code frame. This wobbling signal is inputted to an optical deflector driver 64 and further an optical deflector drive signal outputted from the driver 64 is inputted to an optical deflector 66.

On the other hand, laser light La is continuously irradiated from a laser oscillator 68 onto the optical modulator 54. Thus the laser light La first passes through the optical modulator 54. At that time, the laser light La is subjected to a signal modulation correspondingly to an optical modulator drive signal and is thus changed to laser light Lb, the intensity of which varies with time. This laser light Lb passes through the optical deflector 66. Thus the laser light Lb is changed into laser light Lc which is deflected correspondingly to the optical deflector drive signal. This laser light Lc is irradiated therefrom onto a master disc 72 through an objective lens 70 as a microscopic spot. Further, this microscopic spot is deflected in the radial direction on the master disc 72 by using the optical deflector 66. As a consequence, the wobbled pit pattern as illustrated in FIG. 6(A) is formed. In this manner, the master disc suitable for a copy protection, which includes the train of the wobbling irregular pits, can be obtained.

As described above, the recording device for recording data on the optical disc according to this embodiment records at least a train of irregular pits, which are different in shape and arrangement from normal pits and are arranged correspondingly to data blocks of a recording signal, on a master disc at the time of mastering (namely, at the time of producing the master disc), instead of recording a protection code among data to be recorded on an optical disc. Therefore, manufacturers other than master disc makers require a large plant investment even if a reproduction of an optical disc is performed in a mastering process. Consequently, the manufacturers can not achieve the reproduction practically. Thus, very effective copy protection can be realized (this is the same with embodiments which will be described later).

Incidentally, a recording medium having a wobbling portion to which addresses are written, a recording device for recording data on such a recording medium and a reproduction device for reproducing the data recorded on such a recording medium are disclosed in the Japanese Unexamined Patent Publication (Kokai Koho) Official Gazette No. H2-87344. However, in case of employing such a medium, data should be read bit by bit, as illustrated in FIGS. 3 and 4 of the Japanese Unexamined Patent Publication (Kokai Koho) Official Gazette No. H3-181023. Thus, such a device should be provided with what is called a periodically operating circuit. Moreover, in case of such a device, data decoding timing should be strict. Consequently, the circuit configuration of such a device should be very complex. Furthermore, data recording density is very high. As the result, the reading error rate is liable to become high.

In contrast, in case of this embodiment of the present invention, the circuit configuration of the device can be relatively simple. Further, the manufacturing cost of the reproduction device can be small. Moreover, in a data format, a part corresponding to a bursting portion of a signal continues for a relatively long time. Thus the data recording density can be considerably small. Consequently, data can be decoded without hindrance, independent of a relatively large number of defects of the disc. Namely, in case of this embodiment, a relatively large number of structual defects of the disc are tolerable. Furthermore, the yield of the disc can be increased when manufacturing the discs. Additionally, the manufacturing cost of the disc can be reduced. Meanwhile, generally, dusts are adhered to and scratches are formed on the disc while the disc is used. However, the disc of the present invention is resistant to dust and scratches, because of the fact that the data recording density of a part of the disc corresponding to the bursting portion of the signal is low.

Embodiment 4

① Optical Disc

Next, a fourth embodiment (namely, an optical disc) of the present invention will be described hereinafter in detail by referring to FIGS. 15(A), 15(B) and 15(C) to FIG. 21. This embodiment utilizes the symmetry of an RF signal outputted from the pickup.

First, the shapes of pits formed on the disc will be described hereinbelow in detail with reference to FIGS. 15(A), 15(B) and 15(C) to FIG. 17. FIG. 15(B) illustrates a train of pits having a duty factor of 50%. Further, FIG. 16 illustrates the waveforms of RF signals obtained by reproducing data from the pits of FIGS. 15(A) to 15(C). As can be seen from this figure, the RF signals are symmetric with respect to the center line thereof, namely, the center line of hatched rhombic portions (namely, what are called "eyes") of this figure, which corresponds to what is called the slicing level.

FIG. 15(A) illustrates the train of pits formed as a result of the fact that a recording signal is subjected to a duty-factor correction. As compared with the train of pits of FIG. 15(B), the length in the horizontal direction (namely, in the tangential direction) of each of the pits of FIG. 15(A) is shorter than that of each pit of FIG. 15(B) by a length of a. When data is reproduced from such pits of FIG. 15(A), the symmetry of the RF signal with respect to the center line thereof is lost and the slicing level is shift upwardly in FIG. 16. Similarly as in case of FIG. 15(A), FIG. 15(C) illustrates the train of pits formed as a result of the fact that the recording signal is subjected to a duty-factor correction. Further, as compared with the train of pits of FIG. 15(B), the length in the tangential direction of each of the pits of FIG. 15(C) is longer than that of each pit of FIG. 15(B) by a length of b. When data is reproduced from such pits of FIG. 15(C), the slicing level is shift downwardly in FIG. 16. Namely, the slicing level is moved upwardly and downwardly in FIG. 16 according to change in duty factor of the pits and thus comes to go zig-zag.

Figure 17A:
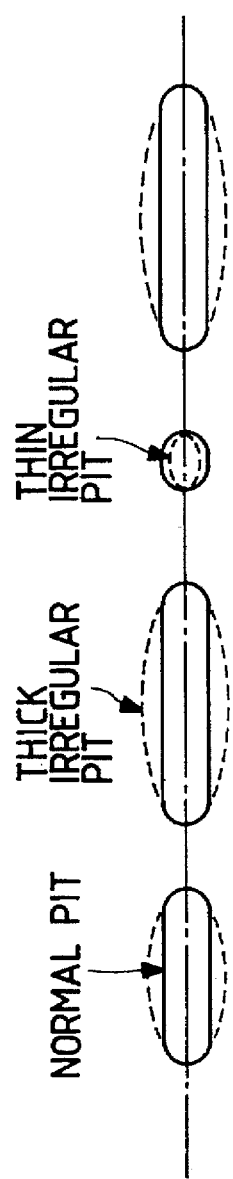
FIGS. 17(A) and 17(B) are diagrams each for illustrating other shapes of irregular pits of the fourth embodiment of the present invention.
Figure 17B:
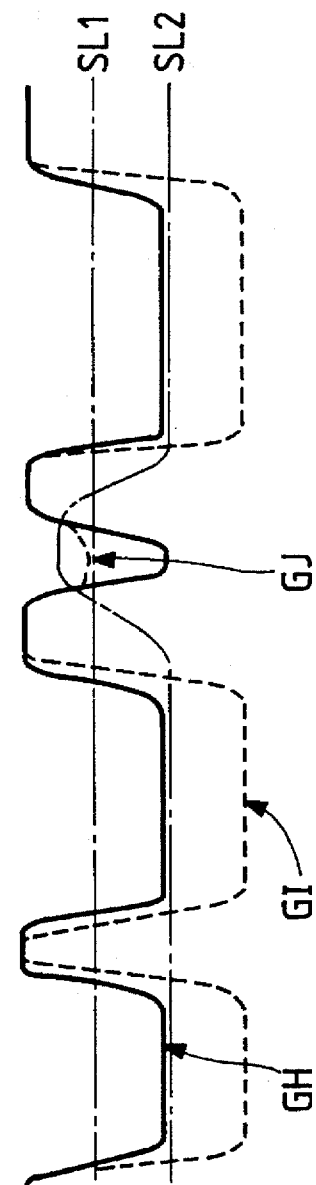

FIG. 17(A) illustrates another examples of the train of pits which cause change in slicing level of the RF signal. In case of this example of the train of the pits, the widths in the radial direction of pits, which are indicated by dotted curves, of this train are larger or smaller than the width of each normal pit, as shown in this figure. FIG. 17(B) illustrates the waveform of the RF signal generated due to the pits of FIG. 17(A). Namely, the RF signal corresponding to a normal pit has a waveform as indicated by a curve GH of FIG. 17(B) and has a slicing level SL1. However, in case of a thick pit which has a width in the radial direction being larger than that of the normal pit, the reflectance is large and thus the modulation factor becomes large. Thus, the RF signal corresponding to this pit has a waveform represented by a curve GI of FIG. 17(B) and the slicing level corresponding to this pit is reduced to SL2. Further, in case of a thin pit which has a width in the radial direction being smaller than that of the normal pit, the modulation factor becomes small as indicated by a curve GJ. Moreover, the slicing level corresponding to this pit is increased. If such irregular pits having different widths are formed alternately, the slicing level goes zig-zag, in comparison with the slicing level corresponding to a normal pit.

② Reproduction Device

Figure 18:
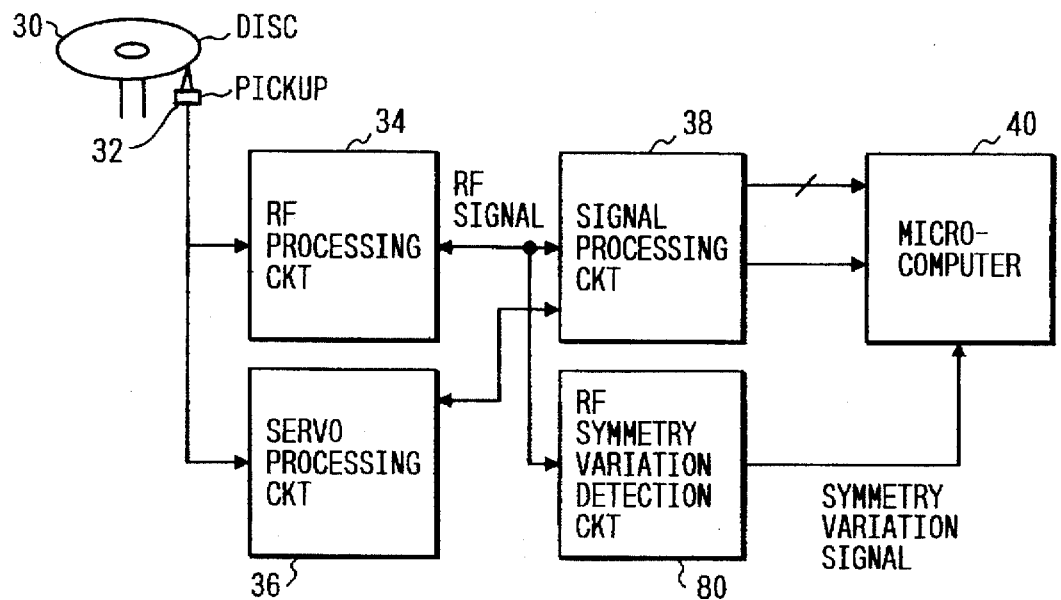
FIG. 18 is a schematic block diagram for illustrating the configuration of a reproducing device for reproducing data from an optical disc (namely, the fourth embodiment) of the present invention.

Next, an example of the reproduction device for checking an illegal copy disc by utilizing the symmetry of the RF signal will be described hereunder in detail by referring to FIG. 18 to FIGS. 20(A), 20(B) and 20(C). FIG. 18 illustrates the configuration of the reproduction device. As can be seen from this figure, a variation-in-symmetry detecting circuit (hereunder sometimes referred to as an RF symmetry variation detection circuit) 80 is provided in the device in place of the burst tracking error detection circuit 42 of FIG. 9. Further, the remaining composing elements of this reproduction device are similar to the corresponding elements of FIG. 9. The RF symmetry variation detection circuit 80 receives an RF signal from the RF processing circuit 34 and detects the variation in symmetry of slicing level thereof and supplies to the microcomputer 40 a detection signal representing a result of the detection.

Figure 19:
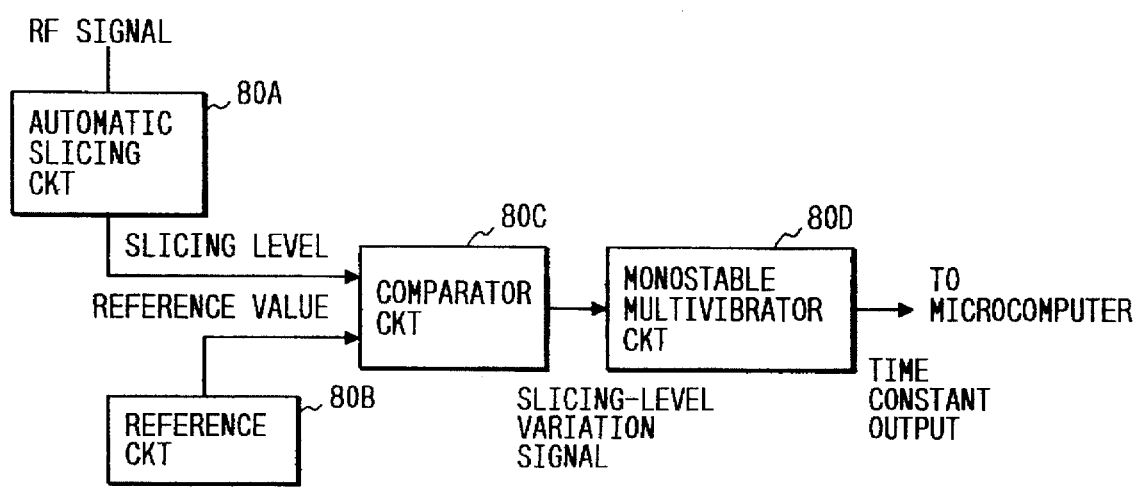
FIG. 19 is a schematic block diagram for illustrating the configuration of am example of a variation-in-symmetry detecting circuit for detecting a variation in symmetry of the waveform of an RF signal of the fourth embodiment of the present invention.

FIG. 19 illustrates the configuration of the RF symmetry variation detection circuit 80. As is shown in this figure, the RF symmetry variation detection circuit 80 is provided with what is called an automatic slicing circuit 80A, a reference output circuit 80B, a comparator 80C and a monostable multivibrator 80D. Generally, an RF signal has an analog waveform. Further, when converting the RF signal into a logical level, it is necessary to adjust the slicing level to the center signal level of the RF signal even when the symmetry of the RF signal with respect to the center signal level is lost (namely, the waveform of the RF signal becomes asymmetric with the center signal level) due to the shapes and arrangement of the pits (namely, due to the irregular pits). The automatic slicing circuit 80A is used to obtain such an adjusted slicing level.

Next, an operation of this device will be described by referring to FIGS. 20(A) to 20(C). When reading the train of the irregular pits of FIGS. 15(A) to 15(C) or of FIGS. 17(A) and 17(B), the "eyes" of the RF signal moves upwardly or downwardly as illustrated in FIG. 16. This is detected by the automatic slicing circuit 80A. FIG. 20(A) illustrates an example of variation in slicing level of the RF signal.

Subsequently, the slicing level is compared by the comparator circuit 80C with a slicing level limits SLL1 and SLL2 of FIG. 20(A) outputted from the reference output circuit 80B. As the result, a slicing level variation signal as illustrated in FIG. 20(B) is outputted from the comparator circuit 80C. This signal is supplied to the monostable multivibrator circuit 80D, whereupon a time constant is given to this signal as shown in FIG. 20(C). Generally, the slicing level varies relatively fast. As a result of giving a time constant, a part of this signal having a slicing level is made to have a duration, by which the microcomputer 40 can detect such a slicing level.

Incidentally, a fundamental operation of recording the irregular pits in a predetermined track of the disc and thereafter detecting the recorded irregular pits therefrom is similar to the corresponding operations of the aforementioned embodiments. Thus, an algorithm for detecting the irregular pits is fundamentally the same as the algorithm of FIG. 13. In case of this reproduction device, the variation in slicing level of the RF signal is detected in step S8. Further, the timing of detection of the irregular pits by the microcomputer 40 is similar to that of FIG. 12(E). Namely, in the time QC, the variation in slicing level of the RF signal is detected, instead of the detection of the tracking error.

Further, a practical example of the automatic slicing circuit 80A of FIG. 19 is an IC "TC9263F" manufactured by Toshiba Corporation, which outputs a signal indicating the slicing level. Further, when the waveform of the RF signal becomes asymmetric with the center level thereof, an analog signal indicating another slicing level fit to such an asymmetric waveform of the RF signal is obtained from this IC.

Thus, in case of the reproduction device according to this embodiment, the asymmetric waveform of the RF signal can not be copied similarly as in case of the third embodiment. Therefore, in case of an illegal copy disc, there occurs no variation in slicing level. Consequently, such an illegal copy disc can be excluded, similarly as in cases of the aforementioned embodiments.

③ Recording Device

Figure 21:
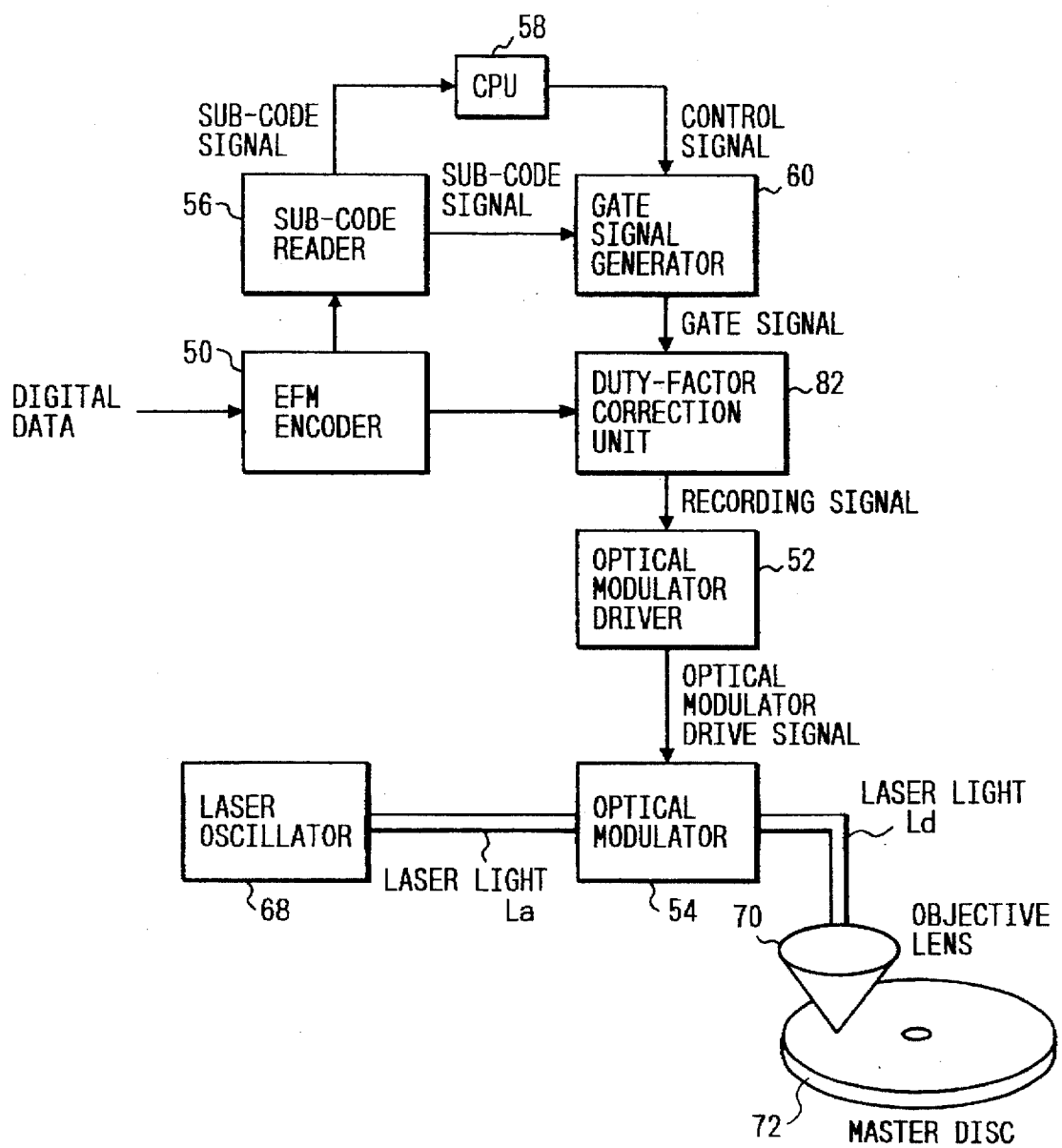
FIG. 21 is a schematic block diagram for illustrating the configuration of a recording device for recording data on an optical disc (namely, the fourth embodiment) of the present invention.

Next, a recording device (namely, a mastering machine or device) for obtaining an optical disc of this embodiment will be described in detail by referring to FIGS. 21 and 22. As illustrated in FIG. 21, digital data used to protect, for example, software for a game is inputted to an EFM encoder 50 which converts the data into an EFM signal and then outputs the EFM signal. On one hand, the EFM signal is inputted to the sub-code reader 56 and a duty-factor correction unit 82. Further, the sub-code reader 56 extracts a sub-code signal from from the EFM signal and then, the sub-code signal is inputted to the CPU 58 and the gate signal generator 60.

Furthermore, the CPU 58 constantly monitors address information represented by the sub-code signal and generates and outputs a control signal when the sub-code signal comes to represent a predetermined address at which a protection code should be recorded. This control signal is inputted to the gate signal generator 60. When receiving the control signal from the CPU 58, the gate signal generator 60 generates a gate signal which is synchronized with a sub-code frame. FIGS. 22(A) to 22(C) illustrate this operation. FIG. 22(A) illustrates the frame Nos.; FIG. 22(B) the waveform of the control signal; and FIG. 22(C) the waveform of the gate signal.

This gate signal corresponds to a protection code. In case where the sub-code frame is, for example, an odd frame, the gate signal has a low signal level corresponding to a logical value of L. Further, in case where the sub-code frame is an even frame, the gate signal has a high signal level corresponding to a logical value of H. Incidentally, it is apparent that in case where the sub-code frame is an odd frame, the gate signal may have a high level corresponding to a logical value of H and, in case where the sub-code frame is an even frame, the gate signal may have a low level corresponding to a logical value of L. Such a gate signal is inputted to the duty-factor correction unit 82. Further, when the gate signal has a high level "H" (namely, in case of an even frame), the duty-factor correction unit 82 performs a predetermined duty-factor correction. However, when the gate signal has a low level "L" (namely, in case of an odd frame), the duty-factor correction unit 82 does not perform such a duty-factor correction. Thereafter, the recording signal, which is corrected in this way, is supplied from the duty-factor correction unit 82 to an outut modulator driver 52. Furthermore, an optical modulator drive signal outputted from the driver 52 is inputted to an optical modulator 54.

On the other hand, laser light La is continuously irradiated from a laser oscillator 88 onto the optical modulator 54. Thus, when the laser light La first passes through the optical modulator 54, the laser light La is subjected to a signal modulation correspondingly to an optical modulator drive signal. Thereby, laser light Ld, the intensity of which varies with time, is obtained. This laser light Ld is irradiated therefrom onto a master disc 72 through an objective lens 70 as a microscopic spot. As a consequence, the pit patterns having different duty factors as illustrated in FIGS. 15(A), 15(B) and 15(C) and FIG. 22(D) are formed.

The slicing level of the RF signal reproduced from such a disc varies as illustrated in FIG. 22(E) in synchronization with the block Nos. of FIG. 22(A). If a signal representing such variation in slicing level is detected as illustrated in FIG. 22(F), this disc is a normal disc. Otherwise, this disc can be judged as an illegal copy disc. Thereby, an illegal copying can be prevented.

Embodiment 5

① Optical Disc

Next, a fifth embodiment of the present invention will be described hereinbelow in detail. This embodiment utilizes variation in amount of light reflected by an optical disc.

First, the shapes of pits formed in the disc will be described hereunder by referring to FIGS. 5(A) to 5(D) and FIGS. 23(A) and 23(B). In case of this embodiment, the pits of FIGS. 5(A) to 5(D), whose reflection light varies in amount, are utilized as irregular pits. In case of an example of FIG. 5(A), the pits PA of the left and right regions are normal pits and the pits PD of the central region are irregular pits, the length of each of which is set to be shorter than a predetermined length according to a modulation rule. Further, in case of another example of FIG. 5(B), no pits are formed in the center region and a mirror mark PE is used similarly to the irregular pits. Moreover, in case of a further example of FIG. 5(C), the pits PF are shallow (or thinner) and smaller than the normal pits. In case of each of these figures, an amount of light reflected by the disc is increased in comparison with a case where only normal pits are formed on the disc.

Figures 23A, 23B:
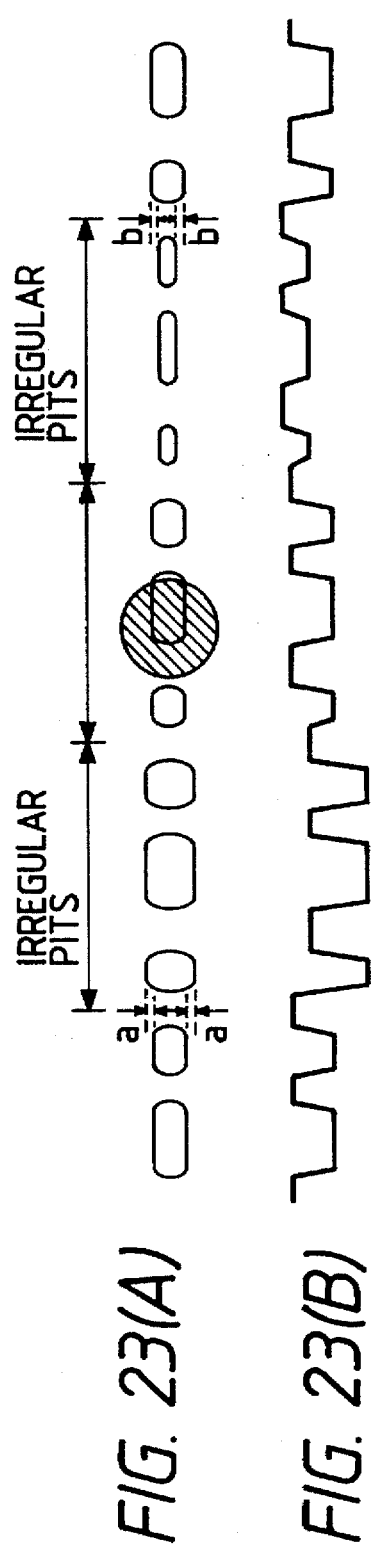
FIGS. 23(A) and 23(B) are diagrams for illustrating another example of trains of irregular pits of a fifth embodiment of the present invention.

FIGS. 23(A) and 23(B) illustrate other examples of the shapes of pits of this embodiment. In FIG. 23(A), the pits of the center region FR are pits formed on this disc, each of which has a normal width. The waveform of a signal obtained as a result of reproduction of such pits is shown in FIG. 23(B). Namely, the reflectance of a part of this signal corresponding to the upper part of the waveform thereof is relatively large, while the reflectance of another part of this signal corresponding to the lower part of the waveform thereof is relatively small.

Further, the width of the irregular pit of the region or section FS of FIG. 23(A) is larger than that of the normal pit of the region or section FR by a width $2a$. In this case, as illustrated in FIG. 23(B), the amplitude of the reproduced signal becomes larger but the total reflectance decreases, in comparison with the case of the signal reproduced from the normal pits. Similarly, the width of the irregular pit of the region or section FT of FIG. 23(A) is smaller than that of the normal pit of the region or section FR by a width $2b$. In this case, as illustrated in FIG. 23(B), the total reflectance increases but the amplitude of the reproduced signal becomes smaller, in comparison with the case of the signal reproduced from the normal pits.

② Reproduction Device

Figure 24:
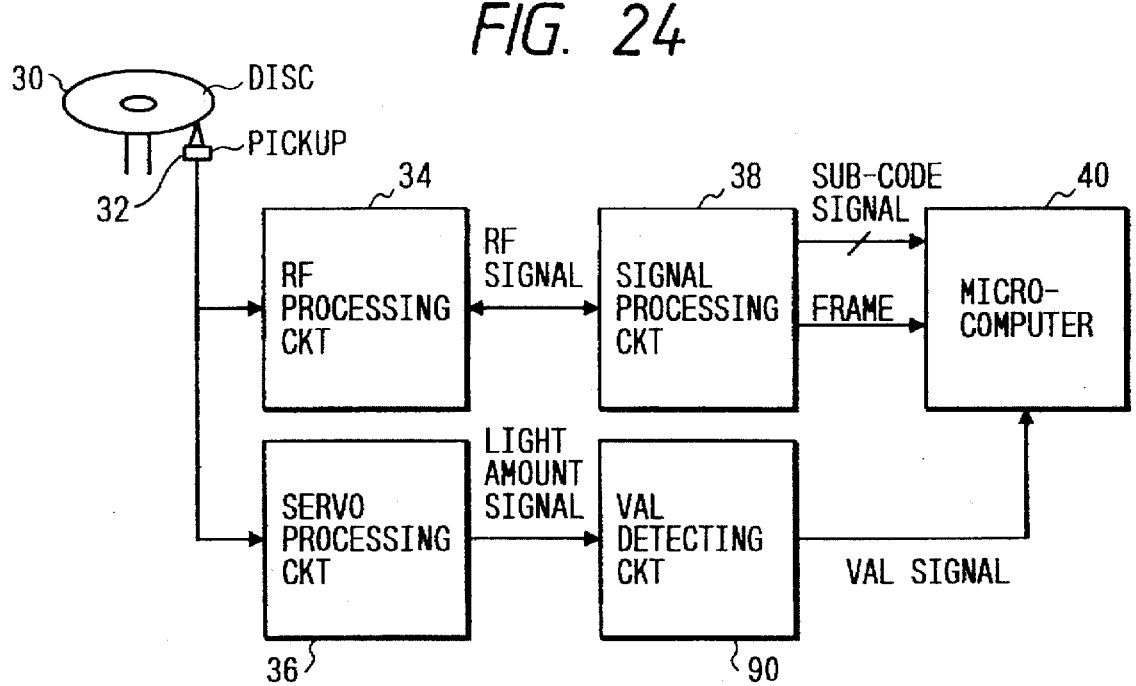
FIG. 24 is a schematic block diagram for illustrating the configuration of a reproducing device for reproducing data from an optical disc (namely, the fifth embodiment) of the present invention.

Next, an example of the reproduction device for checking an optical disc by utilizing variation in amount of reflection light from the irregular pits will be described hereinbelow by referring to FIGS. 5(A) to 5(F), FIG. 24 and FIG. 25. FIG. 24 illustrates the configuration of this reproduction device.

As can be seen from this figure, this device is provided with a variation-in-amount-of-light detecting circuit 90 instead of the burst tracking error detection circuit 42 of FIG. 9. The other composing elements of this reproduction device are similar to the corresponding elements of FIG. 9.

Figure 25:
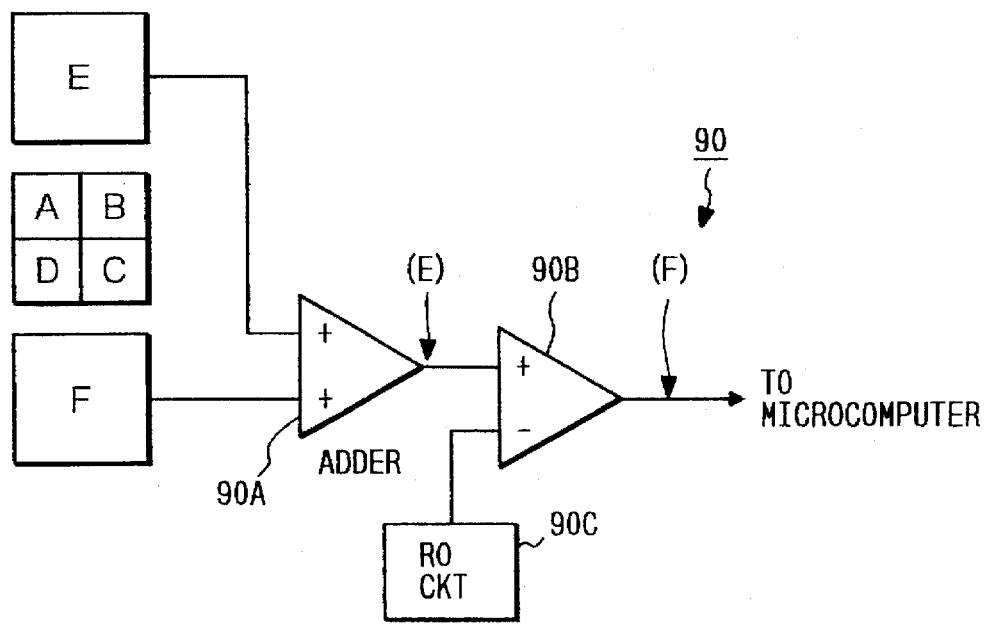
FIG. 25 is a schematic block diagram for illustrating the configuration of an example of a variation-in-amount-of-light detecting circuit.

Further, the variation-in-amount-of-light detecting circuit 90 has a configuration as illustrated in FIG. 25 and adds up light amount signals, which are supplied from the servo processing circuit 36, in the adder 90A thereof. Practically, an addition (E+F) of light amount signals outputted from photodetectors E and F (corresponding to an addition of sub-beams) or an addition (A+B+C+D) of light amount signals outputted from the photodetectors A, B, C and D (corresponding to a full addition of outputs of a four-segment sensor for a main beam) is performed in the adder 90A. Further, an output signal of the adder 90A representing a result of such an addition is a variation-in-amount-of-light signal. Then, this variation-in-amount-of-light signal is compared with a signal representing a reference value $V_T$, which is outputted from the reference output circuit 90C. Subsequently, a variation-in-amount-of-light signal indicating a value greater than the reference value is supplied to the microcomputer 40.

Further, a light amount signal corresponding to the train of the pits of FIG. 5(A), 5(B) or 5(C) has a waveform as illustrated in FIG. 5(D). However, when such a light amount signal passes through the adder 90A, of which the band width and the speed of response are reduced, a signal obtained as a result of the addition (E+F) comes to have a waveform as illustrated in FIG. 5(E). Moreover, only in case that an amount of reflection light obtained for a long time is large, a variation-in-amount-of-reflection-light having a waveform as illustrated in FIG. 5(F) is obtained.

Incidentally, a fundamental operation of recording the irregular pits in a predetermined track of the disc and thereafter detecting the recorded irregular pits therefrom is similar to the corresponding operations of the aforesaid embodiments. Thus, an algorithm for detecting the irregular pits is fundamentally the same as the algorithm of FIG. 13. In case of this reproduction device, the variation in variation in amount of reflection light is detected in step S8. Further, the timing of detection of the irregular pits by the microcomputer 40 is similar to that of FIG. 22(E). Namely, in the time QC, the variation in amount of reflection light is detected, instead of the detection of the tracking error.

In this manner, the reproduction device according to this embodiment utilizes the amount of light reflected by the disc. If the length of the pits are made to be small suitably, data of an optical disc including such pits can be corrected and the corrected data can be copied onto a CD-WO disc without outputting an error signal. However, the irregular pits having the aforementioned shapes can not be copied onto the CD-WO disc. Thus, a disc, in which no variation in amount of the reflection light occurs, can be excluded. Further, if the size of each irregular pit is made to be larger, the reproduction device outputs a data error signal and stops a reproduction operation when trying to reproduce data from the CD-WO disc having such irregular pits. Furthermore, the region containing such irregular pits can not be copied onto the CD-W0 disc. Consequently, an illegal copy disc can be excluded, similarly as in cases of the aforementioned embodiments.

③ Recording Device

Next, a recording device (namely, a mastering machine or device) for obtaining an optical disc of the fifth embodiment will be described in detail by referring to FIG. 26 and FIGS. 27(A) to 27(F). As illustrated in FIG. 26, digital data used to protect, for example, software for a game is inputted to an EFM encoder 50 which converts the data into an EFM signal and then outputs the EFM signal. On one hand, the EFM signal is inputted to a first optical modulator driver 92 which outputs a first optical modulator drive signal. This first optical modulator drive signal is inputted to a first optical modulator 94. On the other hand, the EFM signal is inputted to the sub-code reader 56. Further, the sub-code reader 56 extracts a sub-code signal from from the EFM signal and then, the sub-code signal is inputted to the CPU 58 and the gate signal generator 60. Furthermore, the CPU 58 constantly monitors address information represented by the sub-code signal and generates and outputs a control signal when the sub-code signal comes to represent a predetermined address at which a protection code should be recorded. This control signal is inputted to the gate signal generator 60. When receiving the control signal from the CPU 58, the gate signal generator 60 generates a gate signal which is synchronized with a sub-code frame. FIGS. 22(A) to 22(C) illustrate this operation. FIG. 27(A) illustrates the frame Nos.; FIG. 27(B) the waveform of the control signal; and FIG. 27(C) the waveform of the gate signal.

This gate signal corresponds to a protection code. Further, the gate signal has levels correspondingly to logical values which correspond to odd and even frames, similarly as in cases of the aforementioned embodiments. Furthermore, the gate signal is inputted to a second optical modulator driver 96 which outputs a second optical modulator drive signal to a second optical modulator 98.

On the other hand, laser light La is continuously irradiated from a laser oscillator 68 onto the first optical modulator 94. Thus, when the laser light La first passes through the first optical modulator 94, the laser light La is subjected to a signal modulation correspondingly to a first optical modulator drive signal. Thereby, laser light Le, the intensity of which varies with time, is obtained. Further, when the laser light Le passes through the second optical modulator 98, the laser light La is subjected to a signal modulation correspondingly to a second optical modulator drive signal. Thereby, laser light Lf is obtained. Then, this laser light Lf is irradiated therefrom onto a master disc 72 through an objective lens 70 as a microscopic spot. As a consequence, the pit patterns having different widths as illustrated in FIG. 27(D) are formed.

Thus, if the pits having different widths are arranged as illustrated in FIG. 27(D) correspondingly to the gate signal of FIG. 27(C) synchronized with the block Nos. of FIG. 27(A), the reproduced RF signal having a waveform as illustrated in FIG. 27(E) is obtained. Therefore, the envelope of the waveforms of the reproduced signals varies upwardly and downwardly in synchronization with the block Nos. If a signal representing such variation in envelope is detected as illustrated in FIG. 27(F), this disc is a normal disc. Otherwise, this disc can be judged as an illegal copy disc. Thereby, an illegal copying can be prevented, similarly as in cases of the aforesaid embodiments.

While preferred embodiments of the present invention have been described above, it is to be understood that the present invention is not limited thereto and that other modifications will be apparent to those skilled in the art without departing from the spirit of the invention. For example, the following modifications are apparent to those skilled in the art.

(1) In cases of the above described embodiment, information representing an address at which an irregular pit is formed is preliminarily stored in the checking device. However, in a modification, this information is stored at a predetermined location of the disc. Further, when the disc is set, the checking device first reads (or accesses) the predetermined location of the disc. Thereby, the address, at which the irregular pit is formed, can be changed according to the kind of the disc. Thus, an analysis of a copy protection employed in the disc becomes very difficult. Consequently, an illegal copying can be prevented very effectively.

(2) Further, the irregular pits of the first embodiment, from which the tracking error is obtained, and the irregular pits of the second embodiment, from which the light amount signal is obtained, may coexist in a single disc. Thereby, reliance in detecting an illegal copy disc can be improved.

(3) Incidentally, according to the ordinary standards (for example, JIS (Japanese Industrial Standard), S8605), errors should not exceed a predetermined range. However, as described above, the length of each pit, the degree of wobbling, the symmetry of the RF signal and the variation in amount of RF reflection light may be changed to such an extent that errors are within the predetermined range. In such a case, the irregular pits are not obstacles to the disc.

(4) Further, in the technical fields of a computer game and a video game, it is not necessary that a disc storing a program for a computer game can be reproduced by a machine other than a device dedicated to reproduce this disc. Therefore, the disc for storing a program for a computer game need not be compatible with a disc used for a personal computer or the like. Namely, even if the disc for storing a program for a computer game is not compatible with a disc used for a personal computer or the like, there is no inconvenience practically.

(5) In cases of the aforesaid embodiments, when a disc is set in the device, it is judged whether or not the disc has an irregular pit (namely, whether or not this disc is an illegal copy disc). However, this may be judged at another suitable time (for instance, when an instruction to reproduce data from such a disc is issued).

(6) The first embodiment may be modified by replacing the train of the irregular pits thereof arranged randomly with the trains of the irregular pits periodically arranged as in case of the third embodiment. Even in case of such a modification, similar effects can be obtained. Moreover, the third, fourth or fifth embodiment may be modified by replacing the trains of the irregular pits thereof arranged periodically with the trains of the irregular pits randomly arranged as in case of the first embodiment. Even in case of such a modification, similar effects can be obtained.

The scope of the present invention, therefore, is to be determined solely by the appended claims.

What is claimed is:

1. An optical disc comprising:

a predetermined number of spiral trains of regular pits; and at least one train of irregular pits;

the regular pits of each of the trains being arranged symmetrically with respect to a center of a track;

each of the irregular pits having a predetermined shape different from a shape of each of the regular pits;

an arrangement of the train of the irregular pits being different from an arrangement of each of the trains of the regular pits and being asymmetrical with respect to a center of a track;

the train of the irregular pits having information causing a tracking error signal.

2. A checking device for checking whether an optical disc is a normal disc or an illegal copy disc, wherein the normal disc has a predetermined number of spiral trains of regular pits and at least one train of irregular pits arranged in a given area of the normal disc, the regular pits of each of the trains being arranged symmetrically with respect to a center of a track;

each of the irregular pits having a predetermined shape different from a shape of each of the regular pits;

an arrangement of the train of the irregular pits being different from an arrangement of each of the trains of the regular pits and being asymmetrical with respect to a center of a track, and wherein the illegal copy disc lacks a train of irregular pits in an area thereof which corresponds to the given area of the normal disc;

the checking device comprising:

reproducing means for reproducing information from an area of a checked optical disc which corresponds to the given area of the normal disc; and judgment means for detecting from the information reproduced by the reproducing means whether or not a train of irregular pits is present in the checked optical disc, and for judging from a result of the detection whether the checked optical disc is a normal disc or an illegal copy disc.

3. A checking device for checking whether an optical disc is a normal disc or an illegal copy disc, wherein the normal disc has a predetermined number of spiral trains of regular pits and at least one train of irregular pits arranged in a given area of the normal disc, the regular pits of each of the trains being arranged symmetrically with respect to a center of a track;

each of the irregular pits having a predetermined shape different from a shape of each of the regular pits;

the irregular pits being arranged intermittently on a predetermined area correspondingly to data blocks represented by a modulation signal recorded as the trains of the regular pits, and wherein the illegal copy disc lacks a train of irregular pits in an area thereof which corresponds to the predetermined area of the normal disc;

the checking device comprising:

reproducing means for reproducing information from an area of a checked optical disc which corresponds to the predetermined area of the normal disc; and judgment means for detecting from the information reproduced by the reproducing means whether or not a train of irregular pits is present in the checked optical disc, and for judging from a result of the detection whether the checked optical disc is a normal disc or an illegal copy disc.

4. The optical disc according to claim 1, wherein each of the irregular pits of the train of the irregular pits is arranged on a center line wobbled in a radial direction by a maximum amplitude smaller than a track pitch.

5. The optical disc according to claim 4, wherein:

a wobbling frequency is higher than each frequency of a tracking servo band and is a frequency at which a reproduced signal component included in a tracking error signal becomes minimum and conversely, a wobbling signal carrier becomes maximum when a signal is reproduced by an optical pickup using a side beam for tracking.

6. The optical disc according to claim 1, wherein the train of the irregular pits is arranged on a portion of the disc, and a reproduced signal component included in a tracking error signal becomes smaller in level than a reference level.

7. The optical disc according to claim 1, wherein a duty factor of each of the irregular pits is different from a duty factor of each of the regular pits.

8. The optical disc according to claim 1, wherein a width in a radial direction of each of the irregular pits is different from a width in the radial direction of each of the regular pits.

9. The checking device according to claim 2, wherein the reproducing means has a decoding unit for reading a data block from an information recording portion of the checked optical disc and decoding the data block, and wherein the judgement means comprises:

a first detection unit for detecting whether a servo signal or a data signal is normal or abnormal;

a second detection unit for detecting whether or not output signals of the decoding unit and the first detection unit are related to each other at a predetermined regular point of time; and a judgement unit for judging from a detection signal outputted from the second detection signal whether or not an irregular pit to be preliminarily recorded on the disc is detected;

whereby each volume of the checked optical disc is identifiable as being a volume of an optical disc having only regular pits or a volume of an optical disc having an irregular pit preliminarily recorded thereon.

10. The checking device according to claim 9, which further comprises a tracking error signal detection unit for detecting a tracking error signal;

a third detection unit for detecting whether the signal level of the tracking error signal is nearly constant or changes like that of a burst signal; and a control unit for judging from the tracking error signal whether or not an irregular pit is detected in the checked optical disc and for controlling a reproducing operation to be effected after the judgment is made;

whereby the checking device is operable for discriminating between volumes of the checked optical disc on the basis of the presence or absence of an irregular pit.

11. The checking device according to claim 10, wherein the reproducing means employs a three-spot tracking method, and the third detection unit comprises a bandpass filter circuit, a rectifying circuit and a comparator circuit, and the center frequency of the bandpass filter circuit is set to be a frequency at which the Level of a burst signal appearing in the tracking error signal becomes maximum and the leakage of a data signal appearing in the tracking error signal becomes minimum.

12. The checking device according to claim 1, wherein the judgement means comprises:

a third detection unit for detecting symmetry of a waveform of an RF signal with respect to a slicing level of the RF signal;

a slicing-level changing unit for changing the slicing level of the RF signal according to the detected symmetry;

a comparison unit for determining whether or not the change in slicing level is within a reference range, and a judgment unit for judging from an output signal of the comparison unit whether or not an irregular pit is detected in the checked optical disc;

whereby the checking device is operable for discriminating between volumes of the checked optical disc on the basis of the presence or absence of an irregular pit.

13. The checking device according to claim 1, wherein the judgement means comprises:

an amount-of-reflection-light signal generating unit for irradiating an information recording portion of the checked optical disc with laser light and outputting an amount-of-reflection-light signal representing an amount of light reflected by the optical disc;

a comparison unit for determining whether or not change in the amount-of-reflection-light signal is within a reference range;

an expansion unit for expanding an output signal of the comparison unit; and a judgment unit for judging from an output signal of the expansion unit whether or not an irregular pit is detected in the read optical disc;

whereby the checking device is operable for discriminating between volumes of the checked optical disc on the basis of the presence or absence of an irregular pit.

14. The checking device according to claim 2, wherein the judgment means comprises:

a third detection unit for reading data recorded at each of predetermined addresses in a data block recorded on the checked optical disc and judging whether or not an irregular pit is detected in the disc, by making a determination of:

whether or not a tracking error signal changing like a burst signal is detected in synchronization with a regular point of time determined according to data recorded at the read address;

whether or not variation in slicing level correspondingly to symmetry of a waveform of the RF signal with respect to a slicing level thereof is detected in synchronization with a regular point of time; or whether or not variation in amount of light reflected by the disc is detected in synchronization with the regular point of time;

whereby the checking device discriminates between volumes of the checked optical disc on the basis of the presence or absence of an irregular pit.

15. The checking device according to claim 2, wherein the judgment means comprises a third detection unit for reading data recorded at each of predetermined addresses in a data block recorded on the checked optical disc and judging that an irregular pit is detected in the disc, if it is judged more than a predetermined number of times that a tracking error signal changing like a burst signal is detected in synchronization with a regular point of time determined according to data recorded at the read address, and if it is judged more than a predetermined number of times that a tracking error signal changing like a burst signal is not detected in synchronization with a regular point of time determined according to data recorded at the read address.

16. The checking device according to claim 2, wherein the judgement means comprises:

a storage unit for storing a predetermined address of a data block stored in the checked optical disc, which block is used for determining a kind of the checked optical disk from a result of judging whether or not an irregular pit is detected among information pits formed on the disk, and a third detection unit for reading the data block recorded at the predetermined address when setting the optical disc and for judging whether or not an irregular pit is detected in the disc, by determining:

whether or not a tracking error signal changing like a burst signal is detected in the data block;

whether or not a variation in slicing level of the RF signal is detected in the data block; or whether or not variation in level of an amount-of-reflection-light signal is detected in the data block;

whereby the checking device discriminates between volumes of the checked optical disc on the basis of the presence or absence of an irregular pit.

17. The checking device according to claim 2, wherein the judgment means comprises:

a storage unit for storing a predetermined address, at which a table of addresses of a data block is stored in the checked optical disc, the data block being used for determining a kind of the checked optical disk from a result Of judging whether or not an irregular pit is detected among information pits formed on the disk, and a third detection unit for reading the table at the predetermined address, and next reading the data block stored at the address listed in the table when setting the optical disc and for judging whether or not an irregular pit is detected in the disc, by determining:

whether or not a tracking error signal changing like a burst signal is detected in the data block;

whether or not a variation in slicing level of the RF signal is detected in the data block; or whether or not variation in level of an amount-of-reflection-light signal is detected in the data block;

whereby the checking device discriminates between volumes of the checked optical disc on the basis of the presence or absence of an irregular pit.

18. The optical disc according to claim 1, wherein each of the irregular pits is shorter than each of the regular pits in length along a track.

19. The optical disc according to claim 1, wherein a depth of each of the irregular pits is smaller than a depth of each of the regular pits.

20. The optical disc according to claim 8, wherein the width in the radial direction of each of the irregular pits is smaller than that in the radial direction of each of the regular pits.

21. The checking device according to claim 3, wherein the reproducing means has a decoding unit for reading a data block from an information recording portion of the checked optical disc and decoding the data block, and wherein the judgement means comprises:

a first detection unit for detecting whether a servo signal or a data signal is normal or abnormal;

a second detection unit for detecting whether or not output signals of the decoding unit and the first detection unit are related to each other at a predetermined regular point of time; and a judgement unit for judging from a detection signal outputted from the second detection signal whether or not an irregular pit to be preliminarily recorded on the disc is detected;

whereby the checking device enables each volume of the checked optical disc to be determined as being a volume of an optical disc having only regular pits or a volume of an optical disc having an irregular pit preliminarily recorded thereon.

22. The checking device according to claim 3, wherein the judgement means comprises:

a third detection unit for detecting symmetry of a waveform of an RF signal with respect to a slicing level of the RF signal;

a slicing-level, changing unit for changing the slicing level of the RF signal according to the detected symmetry;

a comparison unit for determining whether or not the change in slicing level is within a reference range, and a judgment unit for judging from an output signal of the comparison unit whether or not an irregular pit is detected in the checked optical disc;

whereby the checking device discriminates between volumes of the checked optical disc on the basis of the presence or absence of an irregular pit.

23. The checking device according to claim 3, wherein the judgement means comprises:

an amount-of-reflection-light signal generating unit for irradiating an information recording portion of the checked optical disc with laser light and outputting an amount-of-reflection-light signal representing an amount of light reflected by the optical disc;

a comparison unit for determining whether or not change in the amount-of-reflection-light signal is within a reference range;

an expansion unit for expanding an output signal of the comparison unit; and a judgment unit for judging from an output signal of the expansion unit whether or not an irregular pit is detected in the read optical disc;

whereby the checking device discriminates between volumes of the checked optical disc on the basis of the presence or absence of an irregular pit.

24. The checking device according to claim 3, wherein the judgment means comprises:

a third detection unit for reading data recorded at each of predetermined addresses in a data block recorded on the checked optical disc and judging whether or not an irregular pit is detected in the disc, by determining:

whether or not a tracking error signal changing like a burst signal is detected in synchronization with a regular point of time determined according to data recorded at the read address;

whether or not variation in slicing level correspondingly to symmetry of a waveform of the RF signal with respect to a slicing level thereof is detected in synchronization with a regular point of time; or whether or not variation in amount of light reflected by the disc is detected in synchronization with the regular point of time;

whereby the checking device discriminates between volumes of the checked optical disc on the basis of the presence or absence of an irregular pit.

25. The checking device according to claim 3, wherein the judgment means comprises a third detection unit for reading data recorded at each of predetermined addresses in a data block recorded on the checked optical disc and judging that an irregular pit is detected in the disc, if it is judged more than a predetermined number of times that a tracking error signal changing like a burst signal is detected in synchronization with a regular point of time determined according to data recorded at the read address, that variation in slicing level correspondingly to the symmetry of the waveform of the RF signal with respect to the slicing level thereof is detected in synchronization with the regular point of time, or that variation in amount of light reflected by the disc is detected in synchronization with the regular point of time, and if it is judged more than a predetermined number of times that a tracking error signal changing like a burst signal is not detected in synchronization with a regular point of time determined according to data recorded at the read address, that variation in slicing level correspondingly to the symmetry of the waveform of the RF signal with respect to the slicing level thereof is not detected in synchronization with the regular point of time, or that variation in amount of light reflected by the disc is not detected in synchronization with the regular point of time.

26. The checking device according to claim 3, wherein the judgement means comprises:

a storage unit for storing a predetermined address of a data block stored in the checked optical disc, which block is used for determining a kind of the checked optical disk from a result of judging whether or not an irregular pit is detected among information pits formed on the disk, and a third detection unit for reading the data block recorded at the predetermined address when setting the optical disc and for judging whether or not an irregular pit is detected in the disc, by determining:

whether or not a tracking error signal changing like a burst signal is detected in the data block;

whether or not a variation in slicing level of the RF signal is detected in the data block; or whether or not variation in level of an amount-of-reflection-light signal is detected in the data block;

whereby the checking device discriminates between volumes of the checked optical disc on the basis of the presence or absence of an irregular pit.

27. The checking device according to claim 3, wherein the judgment means comprises:

a storage unit for storing a predetermined address, at which a table of addresses of a data block is stored in the checked optical disc, the data block being used for determining a kind of the checked optical disk from a result of judging whether or not an irregular pit is detected among information pits formed on the disk, and a third detection unit for reading the table at the predetermined address, and next reading the data block stored at the address listed in the table when setting the optical disc and for judging whether or not an irregular pit is detected in the disc, by determining:

whether or not a tracking error signal changing like a burst signal is detected in the data block;

whether or not a variation in slicing level of the RF signal is detected in the data block; or whether or not variation in level of an amount-of-reflection- light signal is detected in the data block;

whereby the checking device discriminates between volumes of the checked optical disc on the basis of the presence or absence of an irregular pit.

28. The checking device according to claim 3, wherein the judgment means comprises a third detection unit for reading data recorded at each of predetermined addresses in a data block recorded on the checked optical disc and judging that an irregular pit is detected in the disc, if it is determined that:

a) more than a predetermined number of times a tracking error signal changing like a burst signal is detected at a regular timing corresponding to even numbered frames, and b) more than a predetermined number of times a tracking error signal changing like a burst signal is not detected at a regular timing corresponding to odd numbered frames.

29. The checking device according to claim 2, wherein the judgment means comprises a third detection unit for reading data recorded at each of predetermined addresses in a data block recorded on the checked optical disc and judging that an irregular pit is detected in the disc, if it is judged that:

variation in slicing level correspondingly to the symmetry of the waveform of the RF signal with respect to the slicing level thereof is detected at a regular timing corresponding to even-numbered frames, and that variation in slicing level correspondingly to the symmetry of the waveform of the RF signal with respect to the slicing level thereof is not detected at a regular timing corresponding to odd-numbered frames.

30. The checking device according to claim 2, wherein the judgment means comprises a third detection unit for reading data recorded at each of predetermined addresses in a data block recorded on the checked optical disc and judging that an irregular pit is detected in the disc, if it is judged that:

variation in amount of light reflected by the disc is detected at a regular timing corresponding to even-numbered frames, and that variation in amount of light reflected by the disc is not detected at a regular timing corresponding to odd-numbered frames.

31. The checking device according to claim 3, wherein the judgment means comprises a third detection unit for reading data recorded at each of predetermined addresses in a data block recorded on the checked optical disc and judging that an irregular pit is detected in the disc, if it is determined that:

variation in slicing level correspondingly to the symmetry of the waveform of the RF signal with respect to the slicing level thereof is detected at a regular timing corresponding to even-numbered frames, and that variation in slicing level correspondingly to the symmetry of the waveform of the RF signal with respect to the slicing level thereof is not detected at a regular timing corresponding to odd-numbered frames.

32. The checking device according to claim 3, wherein the judgment means comprises a third detection unit for reading data recorded at each of predetermined addresses in a data block recorded on the checked optical disc and judging that an irregular pit is detected in the disc, if it is determined that:

variation in amount of light reflected by the disc is detected at a regular timing corresponding to even-numbered frames, and that variation in amount of light reflected by the disc is not detected at a regular timing corresponding to odd-numbered frames.

33. An optical disc comprising:

a predetermined number of spiral trains of regular pits; and a plurality of trains of irregular pits;

the regular pits in each of the trains being arranged symmetrically with respect to a center of a track;

each of the irregular pits having a predetermined shape different from a shape of each of the regular pits;

an arrangement of each of the trains of the irregular pits being different from an arrangement of each of the trains of the regular pits and being asymmetrical with respect to a center of a track;

each of the trains of the irregular pits having information causing a tracking error signal.

34. The optical disc according to claim 33, wherein the trains of the regular pits and the trains of the irregular pits are alternately arranged along a track at a given alternation period corresponding to a given data block of a record signal.

35. The optical disc according to claim 33, wherein each of the trains of the irregular pits wobbles, and the tracking error signal caused by each of the trains of the irregular pits has a burst shape.

36. The optical disc according to claim 35, wherein each of the trains of the irregular pits wobbles, and the tracking error signal caused by each of the trains of the irregular pits has a burst shape.

37. The optical disc according to claim 34, wherein the given data block corresponds to a frame represented by the record signal.

38. An optical disc comprising:

a predetermined number of spiral trains of regular pits; and at least one unusual area being devoid of regular pits and having a mirror surface, the unusual area being located between two of the trains of the regular pits in a direction along a track;

the regular pits in each of the trains being arranged symmetrically with respect to a center of a track.

* * * * *